(12) United States Patent
Oda et al.

(10) Patent No.: US 6,938,908 B2
(45) Date of Patent: Sep. 6, 2005

(54) AUTOMOTIVE REAR SUSPENSION SYSTEM

(75) Inventors: Masashi Oda, Hiroshima (JP);
Toshihide Koyama, Hiroshima (JP);
Fumitaka Andou, Hiroshima (JP);
Masahito Watanabe, Toyota (JP)

(73) Assignee: Mazda Motor Corporation, Hiroshima (JP)

( * ) Notice: Subject to any disclaimer, the term of this patent is extended or adjusted under 35 U.S.C. 154(b) by 160 days.

(21) Appl. No.: 10/438,332

(22) Filed: May 15, 2003

(65) Prior Publication Data

US 2004/0000767 A1 Jan. 1, 2004

(30) Foreign Application Priority Data

May 22, 2002 (JP) ...................................... 2002-147655

(51) Int. Cl.$^7$ ................................................ B60G 3/20
(52) U.S. Cl. ........................ 280/124.109; 280/124.143; 280/124.145
(58) Field of Search ................... 280/124.109, 124.135, 280/124.143, 124.144, 124.145, 124.15, 124.154

(56) References Cited

U.S. PATENT DOCUMENTS

| | | | | |
|---|---|---|---|---|
| 4,723,791 A | * | 2/1988 | Miura et al. | .......... 280/124.109 |
| 4,957,308 A | * | 9/1990 | Takizawa | ............. 280/124.144 |
| 5,048,860 A | * | 9/1991 | Kanai et al. | .......... 280/124.143 |
| 5,415,427 A | * | 5/1995 | Sommerer et al. | ..... 280/124.135 |
| 5,507,510 A | * | 4/1996 | Kami et al. | ........... 280/124.136 |

FOREIGN PATENT DOCUMENTS

JP          02-038106 A      2/1990

* cited by examiner

*Primary Examiner*—Peter C. English
(74) *Attorney, Agent, or Firm*—Nixon Peabody LLP; Donald R. Studebaker

(57) ABSTRACT

In a multi-link rear suspension (A) in which a wheel support (11) is connected to a vehicle body through five links (6–10) and vehicle body side ends of the links are provided with rubber bushes (26), respectively, the lower end of a damping device (14) formed by coaxially arranging a coil spring (12) and a damper (13) is pivoted to a portion of the wheel support (11) located toward the inside of the vehicle body so that the vertical reaction force of the damping device (14) produces a moment Mn toward negative camber on a rear wheel (2). The moment Mn is set to be always larger than a moment Mp toward positive camber produced by a side force on the outside rear wheel (2) during vehicle cornering until limit maneuvering conditions of the outside rear wheel due to the side force are reached. The damping device (14) is disposed with respect to a suppositive king pin axle K so that the vertical reaction force thereof produces a moment toward toe-in on the rear wheel (2). In this manner, the multi-link suspension provides a sharp driving feeling applicable even for a sports car while maintaining a good ride through the involvement of the rubber bushes (26).

19 Claims, 15 Drawing Sheets

AUTOMOTIVE REAR SUSPENSION SYSTEM

BACKGROUND OF THE INVENTION (1) Field of the Invention

This invention generally relates to automotive rear suspension systems, and particularly relates to multi-link suspensions with five I-links.

(2) Description of the Related Art

There have been known conventional multi-link suspensions with five I-links, each I-link including a resilient bush at least at an end thereof located toward the vehicle body (see, for example, Japanese Unexamined Patent Publication No. 2-38106). In such a multi-link suspension with five I-links, I-links can be arranged to optimally constrain movement of the rear wheel in accordance with five-way freedom of movement of the rear wheel except for up and down strokes. Therefore, this suspension is of the type having great performance potential.

Problems that the Invention is to Solve

However, multi-link suspensions generally have a problem about rigidity, and this problem is particularly noticeable in the above-described structure in which links are mounted to a suspension member through resilient bushes. Specifically, when the wheel receives a side force during cornering, the resilient bush for each link deflects to give the driver a sense of reduced rigidity and produce a delay of suspension response corresponding to the deflection.

Furthermore, the wheel alignment depending upon how the links are geometrically arranged changes by the amount of deflection of the resilient bushes. The high design flexibility of the multi-link suspension makes it very difficult to design and manage the resilient bushes to deflect in respective optimal directions even when they input any load. Therefore, it is difficult that the multi-link suspension exhibits suspension performance as expected.

In view of these points, multi-link suspensions are generally employed for classy sedans and the like which place emphasis on ride quality rather than handling stability and require high straight running stability during high-speed running rather than cornering performance. As a matter of fact, they are not employed for sports cars and the like which place severer requirements on handing stability and cornering performance in limit maneuvering conditions than on ride quality.

If the multi-link suspension did not employ any resilient bushes and all the links were connected to the vehicle body through ball joints, there would not be caused any problem due to deflection of the bushes. This not only provides enhanced rigidity and response but also enables the alignment accuracy to be maintained in an intended state. It therefore goes without saying that the suspension can achieve an excellent handling stability in combination with its fundamentally high potential. In this structure, however, vibration and noise absorption to be contributed by resilient bushes will not be expected at all. Thus, road noise is increased, and noises caused by link resonance and other noises are all transmitted to the vehicle body, which makes it impossible to put the suspension into practical use for a passenger car. Also in this respect, the multi-link suspensions with five I-links are difficult to employ for commercial type cars, even if sports cars, which are required to perform vibration and noise absorption.

In view of the foregoing problems, it is an object of the present invention to provide a multi-link rear suspension system with five I-links, each I-link including a resilient bush at least at an end thereof located toward a vehicle body, based on a completely new knowledge that the suspension can exhibit sufficient anti-vibration performance for a commercial type car while ensuring a high handling stability applicable for a vehicle that requires high performance as a sports car.

SUMMARY OF THE INVENTION

To attain the above object, in the rear suspension system according to the present invention, a vertical reaction force of a damping device is used to allow a moment toward negative camber and toe-in to act on a rear wheel of a vehicle, and the moment toward negative camber is maintained for the outside rear wheel during cornering until the grip limit conditions are reached against increase in a side force on the outside rear wheel. Thereby, an urging force in an optimal direction is applied to a resilient bush for each link, resulting in eliminating inconveniences due to the deflection of the resilient bush.

More specifically, the first invention is directed to a multi-link rear suspension system in which a support member for a rear wheel of a vehicle is connected to a vehicle body through five links, at least ends of the links toward the vehicle body are provided with resilient bushes, respectively, and a lower end of a damping device constituted by a coil spring and a damper is pivoted to a portion of the support member for the rear wheel located toward the inside of the vehicle body. Further, the damping device is disposed with respect to a suppositive king pin axle for the rear wheel so that a vertical reaction force thereof produces a moment toward toe-in about the suppositive king pin axle, the damping device is spaced apart from the rear wheel toward the inside of the vehicle body so that the vertical reaction force thereof produces a moment toward negative camber on the rear wheel, and the moment toward negative camber produced by the vertical reaction force of the damping device is set to be always larger than any moment toward positive camber produced by a side force on the outside rear wheel during vehicle cornering until limit maneuvering conditions due to the side force for the outside rear wheel during cornering are reached.

With the above arrangement, since the automotive rear suspension system is of multi-link type that includes five links, the movement of the rear wheel can be optimally constrained in five-way freedom of movement. Therefore, the suspension can have high potential as compared with suspensions using an A-arm or an H-arm. In addition, the suspension can offer an excellent ride through the involvement of the resilient bushes.

Furthermore, a moment toward toe-in produced by a reaction force of the damping device acts on the rear wheel through its support member, and the resilient bush for each link is thereby previously urged (pre-compressed) toward toe-in of the wheel. Therefore, during vehicle cornering, a delay due to deflection of the resilient bushes can be eliminated and a desired amount of toe-in can be immediately applied on the outside rear wheel during cornering. As a result, there can be offered a sharp drive feeling involving the least phase delay ever experienced as a multi-link suspension system, or extremely high response and a sense of extremely high rigidity.

Specifically, in a general multi-link suspension, a lateral acceleration developed after the start of the driver's steering causes load shift to the outside of the cornering, and cornering forces are thereby produced on respective wheels. In this invention, at the stage of load shift earlier than the stage of production of cornering forces, i.e., at the stage of production of a vertical reaction force, a desired amount of toe-in can be applied to the rear wheel by the vertical reaction force. This steepens the rise of cornering forces to reduce a phase delay.

Furthermore, a vertical reaction force of the damping device acts as a moment toward negative camber on the rear wheel through the support member, and the moment is always larger than any moment toward positive camber produced by a side force on the outside rear wheel during vehicle cornering until the limit maneuvering conditions for the outside rear wheel due to the side force are reached. Therefore, the resilient bushes of the links for the outside rear wheel during cornering always experience urging forces fixedly directed in respect of camber change of the rear wheel. This prevents minute wobbling of the rear wheel, thereby eliminating spoilage of a driving feeling and unnatural behavior. As a result, the best handling stability ever experienced as a multi-link suspension system can be obtained.

In order to urge the rear wheel toward toe-in by a vertical reaction force of the damping device as described above, it is necessary that the direction and point of application of the reaction force on the support member for the rear wheel are set optimally with respect to the suppositive king pin axle. Specifically, for example, the suppositive king pin axle for the rear wheel may be inclined rearward so that its portion closer to the upper end is located closer to the rear of the vehicle body, the axis of the damping device may be located inwardly from the suppositive king pin axle in non-parallel and non-intersecting relation to the suppositive king pin axle, and the inclination of the axis of the damping device as viewed from the side of the vehicle body may be set to be closer to a vertical direction than the suppositive king pin axle (the second invention).

Furthermore, in order to allow a moment toward negative camber to act on the rear wheel by the vertical reaction force of the damping device, the lower end of the damping device may be pivoted to a portion of the support member for the rear wheel located toward the inside of the vehicle body so that the vertical reaction force can act at a point downwardly from the center of the rear wheel. In this case, during vehicle cornering, the roll of the vehicle body is increased substantially in proportion with the increase of the side force on the rear wheel, so that the coil spring of the damping device is compressed to increase its reaction force. Therefore, the moment toward negative camber produced by the reaction force is also increased. Meanwhile, a moment toward positive camber is directly produced on the outside rear wheel during cornering by a side force. Eventually, as regarding the outside rear wheel during cornering, with the increase of the lateral acceleration, the moment toward positive camber due to the side force as well as the moment toward negative camber due to the vertical reaction force of the damping device are increased.

In these conditions, if the distributed load to the outside rear wheel during cornering, the maximum grip of the rear wheel, the hardness of the coil spring of the damping device (the spring constant), the arm length of a moment produced on the rear wheel by a damping device reaction force, and so on are optimally set up considering their interrelation, a sufficiently large moment toward negative camber can be brought to bear on the rear wheel by the vertical reaction force of the damping device. This moment toward negative camber can be always larger than any moment toward positive camber due to the side force until the limit maneuvering conditions due to the side force are reached.

As a more specific example, a moment toward negative camber acting on the rear wheel by a vertical reaction force of the damping device can be represented as the product of the distance from the axis of the damping device to the rear wheel center (i.e., the arm length of the moment) and the damping device reaction force. Here, the damping device vertical reaction force itself is determined by the distributed load to the rear wheel, the hardness of the coil spring, and so on, i.e., the roll characteristics of the vehicle. Therefore, in order to gain a sufficiently large moment toward negative camber, it is necessary in fact to lengthen the moment arm. For example, it can be considered to suppose limit maneuvering conditions due to a side force where the rear wheel during vehicle cornering reaches the maximum lateral acceleration, and to set the arm length of a moment toward negative camber due to a damping device reaction force so that the moment toward negative camber can be larger than a moment toward positive camber acting on the rear wheel by the side force in limit maneuvering conditions.

In the rear suspension system having the above structure, according to the third and fourth invention, the lower end of the damping device is pivoted to one end of a connecting part formed integrally with the support member for the rear wheel to extend from the support member toward the inside of the vehicle body. In order to exert a large moment on the rear wheel by a vertical reaction force of the damping device, it is preferable to largely extend the connecting part from the support member for the rear wheel toward the inside of the vehicle body. By integrally forming the connecting part with the support member, the connecting part can be reduced in weight while ensuring its strength and the increase of so-called unsprung weight can be minimized.

In the fifth invention, the connecting part has upper and lower arms that extend from upper and lower ends of a body of the support member toward the inside of the vehicle body and are combined together at their ends remote from the body of the support member, and an intermediate arm extending vertically to connect the upper and lower arms between their intermediate points in a widthwise direction of the vehicle, one end of a fulcrum pin disposed across the intermediate arm and the remote ends of the upper and lower arms extends beyond the end of the connecting part toward the inside of the vehicle body, and the lower end of the damping device is fitted to said one end of the fulcrum pin.

With this arrangement, the connecting part has substantially the general form of a laterally oriented "A" constituted by the upper arm, the lower arm and the intermediate arm. Therefore, the connecting part can be reduced in weight while ensuring sufficient rigidity for vertical load. Furthermore, since the damping device is fitted to the fulcrum pin attached to the connecting part at two points spaced apart from each other by a sufficient distance between the crossbar (intermediate arm) and the top of A-form, this ensures that the vertical reaction force of the damping device is transmitted to the rear wheel.

In the rear suspension system, the suppositive king pin axle for the rear wheel is preferably set to have a negative caster trail amount (sixth and seventh inventions). Specifically, this setting is implemented by putting the intersection of the suppositive king pin axle and the road surface at a position closer to the rear of the vehicle body than the contact point of the rear wheel with the road surface when viewed from the side of the vehicle body.

In this manner, the point of application of a side force on the rear wheel is located closer to the front of the vehicle body than the suppositive king pin axle, and the side force directly produces a moment toward toe-in on the rear wheel. Therefore, a desired amount of toe-in can be applied to the outside rear wheel during cornering by the side force, thereby stabilizing the behavior of the outside rear wheel. In addition, an urging force toward toe-in is previously applied to the rear wheel by a reaction force of the damping device. As a result, the outside rear wheel during cornering is consistently urged toward toe-in, which provides a natural driving feeling and a sense of high stability.

The damping device is preferably disposed so that an urging force in a longitudinal direction of the vehicle body acting on the rear wheel by the vertical reaction force of the damping device becomes very small or zero (eighth and ninth inventions).

In this manner, even if the vertical reaction force acting on the support member of the rear wheel from the damping device is very large, the longitudinal force acting on the rear wheel due to the vertical reaction force becomes very small. Thus, the longitudinal force can be prevented from excessively restricting the displacement of the rear wheel in the car longitudinal direction during vehicle moving, thereby offering a good ride even on an uneven road surface or the like. For this purpose, for example, the inclination of the axis of the damping device or the car lengthwise distance between the axis of the damping device and the center of the rear wheel may be empirically set, in accordance with demands for riding comfort or the like, so that the longitudinal force acting on the rear wheel by the vertical reaction force of the damping device is sufficiently small.

The axis of the damping device is preferably set to extend substantially in a vertical direction when viewed from the side of the vehicle body (tenth invention). In this manner, even if the vertical reaction force of the damping device is extremely large, it does not bring a longitudinal force to directly bear on the rear wheel. Therefore, the effects of the eighth and ninth inventions can be sufficiently obtained. Alternatively, the axis of the damping device may be inclined so that its portion closer to the upper end is located closer to the inside of the vehicle body when viewed in the longitudinal direction of the vehicle body, and the damping device may be spaced a predetermined distance or more apart from the support member for the rear wheel toward the inside of the vehicle body (eleventh invention).

The damping device may be disposed to slightly urge the rear wheel toward the front of the vehicle body by its vertical reaction force (twelfth invention). In this respect, the most important point of the present invention is that in the multi-link rear suspension system, a vertical reaction force of the damping device is exerted toward negative camber and toe-in on the rear wheel. However, there may be cases where the longitudinal force acting on the rear wheel by the reaction force of the damping device can be reduced to a small amount, as in the eighth and ninth inventions, but not to zero.

In such cases, the longitudinal force on the rear wheel is preferably set to the direction toward the front of the vehicle body. In this manner, each of the resilient bushes of the links of the rear wheel experiences an urging force toward the front of the vehicle body. Therefore, when a shock from an uneven road surface or the like is input to the rear wheel, the direction of the force on each resilient bush is inverted so that the resilient bush is deflected in the opposite direction. As a result, the rear wheel is displaced toward the rear of the vehicle body to relieve the shock, thereby offering a good ride.

In the rear suspension systems according to the eighth invention, it is preferable that the axis of the damping device is located closer to the rear of the vehicle body than the center of the rear wheel when viewed from the side of the vehicle body, and that the resilient bush for a lower link of the five links is softer than the resilient bush for an upper link thereof (thirteenth invention).

In this manner, a vertical reaction force of the damping device produces a moment about the axis of the rear wheel on the support member of the rear wheel, and the moment applies longitudinal urging forces to the respective upper and lower links. For example, when the left-side rear wheel is viewed from the left of the vehicle body, the vertical reaction force of the damping device acts on the support member, at a position rightward (toward the rear of the vehicle body) from the center of the rear wheel, from above substantially along the vertical, which produces a clockwise moment on the wheel support. The result is that the upper link is urged rightward (toward the rear of the vehicle body) to allow an urging force toward the rear of the vehicle body to act on the resilient bush of the upper link, and that the lower link is urged leftward (toward the front of the vehicle body) to allow an urging force toward the front of the vehicle body to act on the resilient bush of the lower link.

Furthermore, with the use of a relatively soft resilient bush for the lower link, when s shock from an uneven road surface or the like is input to the rear wheel, the resilient bush for the lower link is deflected in the opposite direction by the inversion of the urged force, and the rear wheel is thus allowed to displace toward the rear of the vehicle body. This offers a good ride as in the twelfth invention.

In the rear suspension system according to the twelfth invention, the rear wheel is preferably a driving wheel (fourteenth invention). In the rear suspension system according to the twelfth invention, as described above, the resilient bush for at least one predetermined link for the rear wheel is previously urged toward the front of the vehicle body by the vertical reaction force of the damping device. Therefore, if the rear wheel is a driving wheel, when a driving force (a force toward the front of the vehicle body) is applied to the rear wheel as a driving wheel during vehicle acceleration, a delay due to the deflection of the resilient bush can be reduced. This increases vehicle acceleration response.

In addition, during vehicle acceleration, squat movement of the vehicle body increases the amount of bump in the rear suspension, and the coil spring of the damping device for the rear wheel is thus compressed. Therefore, with the increase of the amount of bump, i.e., with the increase of the driving force, the vertical reaction force of the damping device is increased. Accordingly, the urging force on the resilient bush is increased more as the vehicle is accelerated more abruptly. As a result, the vehicle can obtain large acceleration response without any delay even if a large driving force acts on the rear wheel.

In the above case that at least one said resilient bush for the rear wheel is previously urged toward the front of the vehicle body, when a braking force (a rearward force) acts on the rear wheel from the road surface during vehicle braking, the braking force may not be transmitted to the vehicle body until before it overcomes the urging force on the resilient bush to invert the direction of deflection of the resilient bush. Therefore, the braking of the vehicle body might be delayed to spoil the brake feeling.

In this invention, however, the rear suspension during braking is increased in the amount of rebound by nose-dive of the vehicle body, and the vertical reaction force of the damping device is decreased correspondingly, i.e., in accordance with the increase of the braking force. Therefore, the urging force on the resilient bush due to the reaction force is also reduced so that the direction of its deflection can be inverted correspondingly earlier. As a result, the brake feeling is not substantially impaired.

By changing the arrangement of the links and damping device, the axis of the damping device may be located apart from the center of the rear wheel when viewed from the side of the vehicle body. In this manner, when the amount of bump in the rear suspension is increased during vehicle acceleration, the urging force on the resilient bush can be increased at a fast rate beyond the proportionality with the increase of the amount of bump. Likewise, if the axis of the damping device is set to approach the center of the rear wheel during rebound, the urging force on the resilient bush can be decreased at a fast rate beyond the inverse proportionality with the increase of the amount of rebound. Therefore, these settings can enhance the effects of the invention.

Furthermore, in the rear suspension system according to the twelfth invention, it is preferable that the five links includes at least two lower links, and that the two lower links are arranged to come close to each other toward the outside of the vehicle body when viewed from above the vehicle body (fifteenth invention). In the rear suspension system according to the twelfth invention, as described above, the resilient bush for at least one of the links in the rear suspension system is previously urged toward the front of the vehicle body by the vertical reaction force of the damping device. Thus, during braking, the transmission of a braking force to the vehicle body might be delayed to spoil the brake feeling.

On the other hand, in this invention, the arrangement of two lower links allows the rear wheel to displace toward the rear of the vehicle body during braking, thereby geometrically increasing the amount of toe-in. This steepens the rise of a braking force produced between the rear wheel and the road surface. Therefore, the steepened rise of the braking force can compensate for the above-described transmission delay of the braking force due to deflection of the resilient bush, thereby preventing spoilage of the brake feeling.

The rear suspension system is preferably arranged so that the amount of toe-in of the outside rear wheel during cornering is increased by roll steering during bump and also increased by side force compliance steering (sixteenth invention).

With this arrangement, the outside rear wheel during cornering increases the amount of toe-in, with the increase of a side force, by roll steering and side force compliance steering. Therefore, the vehicle behavior during cornering can be stabilized.

In the rear suspension system, it is preferable that a bump stopper for restricting approaching displacement of the rear wheel to the vehicle body is disposed coaxially with the damping device, and that the suspension system is arranged so that the moment toward toe-in acting on the rear wheel by the vertical reaction force of the damping device is increased as a result of the reaction force of the damping device being increased by the action of the bump stopper (seventeenth invention).

In order to stabilize the behavior of the vehicle during cornering, generally, it is preferable to increase the amount of toe-in of the rear wheel substantially in proportion with the increase of lateral acceleration. If the rate of change of the amount of toe-in is changed halfway, then vehicle behavior may be largely changed. With such a bump stopper as above, it restricts the suspension stroke and cannot avoid an abrupt change in the rate of increase in the amount of toe-in, for example, by roll steering. This is a cause for that many kinds of conventional cars have an undesirable nature that the rear wheel during cornering loose grip in the vicinity of limit maneuvering conditions due to a side force to invite a large behavior change.

In this invention, however, during a bump stroke of the suspension, the coil spring of the damping device is compressed, and the reaction force of the coil spring is increased substantially in proportion with the side force. Then, by the action of the bump stopper coaxial with the coil spring, the spring constant of the entire damping device is increased one step, which abruptly increases the vertical reaction force of the damping device. Thus, the moment toward toe-in due to the reaction force is synergistically increased. Therefore, the moment and the above-described abrupt change in the amount of toe-in by roll steering are offset each other. As a result, a behavior change of the vehicle in limit maneuvering conditions can be minimized to provide improved running stability.

Furthermore, in the rear suspension system, it is preferable that the ends of the five links toward the vehicle body side are connected to a sub frame, and that the sub frame is mounted to the vehicle body through three resilient mounts at each of the right and left sides of the vehicle body or a total of six resilient mounts (eighteenth invention).

The vehicle rear suspension system according to the invention is of multi-link type in which each suspension includes five links, and is arranged so that a vertical reaction force of the damping device is used to apply appropriate urging forces to the resilient bushes for each link, thereby eliminating adverse effects due to deflection of the resilient bushes and providing a sharp driving feeling. If urging forces are applied to the resilient bushes in this manner, this may impair the ride quality to some extent.

To cope with this, in this invention, all of the five links are connected to the sub frame, and the sub frame is mounted to the vehicle body through a total of six resilient mounts. Thus, this invention provides for improved ride quality without deteriorating handling stability. As compared with a general case where the number of resilient mounts for the sub frame is four, the use of six resilient mounts correspondingly decreases the distributed load of each mount, which enables the use of relatively soft mounts. Therefore, vibrations and so on can be absorbed between the sub frame and the vehicle body, resulting in improved ride quality. Furthermore, since all of the five links are mounted to the sub frame, even if the entire sub frame is displaced with respect to the vehicle body, the suspension links do not change the relative position between them and the relative position with the road surface. Therefore, the handling stability are not substantially affected by the displacement of the sub frame.

The nineteenth invention is directed to a multi-link rear suspension system in which a support member for a rear wheel of a vehicle is connected to a vehicle body through five links, at least ends of the links toward the vehicle body are provided with resilient bushes, respectively, and a lower end of a damping device constituted by a coil spring and a damper is pivoted to a portion of the support member for the rear wheel located toward the inside of the vehicle body.

Furthermore, the suppositive king pin axle for the rear wheel is inclined rearward so that its portion closer to the upper end is located closer to the rear of the vehicle body and is set to have a negative caster trail amount. The axis of the damping device is located inwardly from the suppositive king pin axle in non-parallel and non-intersecting relation to the suppositive king pin axle, also located at a position closer to the rear of the vehicle body than the center of the rear wheel when viewed from the side of the vehicle body, and set to extend substantially in a vertical direction.

Moreover, the damping device is spaced a predetermined distance or more apart from the rear wheel toward the inside of the vehicle body so that a moment toward negative camber acting on the rear wheel by a vertical reaction force of the damping device is always larger than any moment toward positive camber produced by a side force on the outside rear wheel during cornering of the vehicle until limit maneuvering conditions due to the side force for the outside rear wheel during cornering are reached.

With the above arrangement, the nineteenth invention can obtain the same effects as described above in the first and second inventions.

As described so far, in the automotive rear suspension system according to the first invention, a multi-link rear suspension system with five links, each link including a resilient bush at least at the vehicle body side end, is arranged so that a vertical reaction force of the damping device is positively used to allow a moment toward negative camber and tow-in to previously act on a rear wheel and the moment toward negative camber is set to be always larger than any moment toward positive camber produced by a side force. This eliminates deterioration in the sense of rigidity due to the deflection of the resilient bushes and minute wobbling of the wheel while ensuring a good ride through the involvement of the resilient bushes. As a result, the rear suspension provides an extremely sharp driving feeling applicable for a sports car and a high handling stability.

In the second invention, since the axis of the damping device is placed appropriately with respect to the suppositive king pin axle for the rear wheel, an urging force toward toe-in can be applied to the rear wheel. Thus, the effects of the first invention can be sufficiently exerted.

In the third and fourth inventions, since the lower end of the damping device is pivoted to the connecting part formed integrally with the support member for the rear wheel, the unsprung weight can be reduced while the strength of the connecting part can be ensured.

In the fifth invention, since the connecting part of the support member for the rear wheel has substantially the form of a laterally oriented "A" when viewed in the vehicle longitudinal direction, the connecting part can be reduced in weight while ensuring sufficient rigidity.

In the sixth and seventh inventions, since the suppositive king pin axle for the rear wheel is set to have a negative caster trail amount, a side force can cause a moment toward toe-in to directly act on the outside rear wheel during cornering. Thus, the vehicle behavior can be stabilized.

In the eighth and ninth inventions, since the vertical reaction force of the damping device does not largely act on the rear wheel in terms of the vehicle longitudinal direction, this prevents the deterioration of the ride quality due to an uneven road surface or the like.

In the tenth invention, since the axis of the damping device is set to extend substantially in a vertical direction when viewed from the side of the vehicle body, the effects of the eighth and ninth inventions can be sufficiently exerted.

In the twelfth invention, since the resilient bush is not urged toward the rear of the vehicle body by the reaction force of the damping device, this prevents the deterioration of the ride quality due to an uneven road surface or the like.

In the thirteenth invention, since the axis of the damping force is located closer to the rear of the vehicle body than the center of the rear wheel to apply an urging force toward the front of the vehicle body on the lower link using the vertical reaction force, and the resilient bush for the lower link is softer than the resilient bush for the upper link thereof, this absorbs and relieves a shock from an uneven road surface or the like, thereby offering a good ride.

In the fourteenth invention, since the rear wheel is a driving wheel, the resilient bush is previously urged toward the front of the vehicle body by the vertical reaction force of the damping device. Thus, a transmission delay of a driving force due to the deflection of the resilient bush can be reduced, thereby increasing vehicle acceleration response.

In the fifteenth invention, the arrangement of the two lower links allows a desired amount of toe-in to be applied to the rear wheel by a braking force during braking. This steepens the rise of a braking force produced between the rear wheel and the road surface. Therefore, even if the transmission of a braking force to the vehicle body is delayed by the deflection of the resilient bush, impairment of the brake feeling can be prevented as the entire vehicle.

In the sixteenth invention, the amount of toe-in of the outside rear wheel during cornering can be increased with the increase of the lateral acceleration during cornering, thereby stabilizing the vehicle behavior.

In the seventeenth invention, by the action of the bump stopper coaxial with the coil spring, the vertical reaction force of the damping device is increased one step. Therefore, the decrease in the mount of toe-in due to roll steering involved with the action of the bump stopper is offset by the increased vertical reaction force. As a result, a change of amount of toe-in of the rear wheel in limit maneuvering conditions can be moderated to provide improved running stability.

In the eighteenth invention, since the five links are mounted to the vehicle body through the sub frame, and the sub frame is mounted to the vehicle body through a total of six resilient mounts, this improves ride quality without deteriorating handling stability.

In the vehicle rear suspension system according to the nineteenth invention, the same effects as in the first and second invention can be obtained.

DETAILED DESCRIPTION OF THE INVENTION

Hereinafter, embodiments of the present invention will be described with reference to the drawings.

Figure 1:
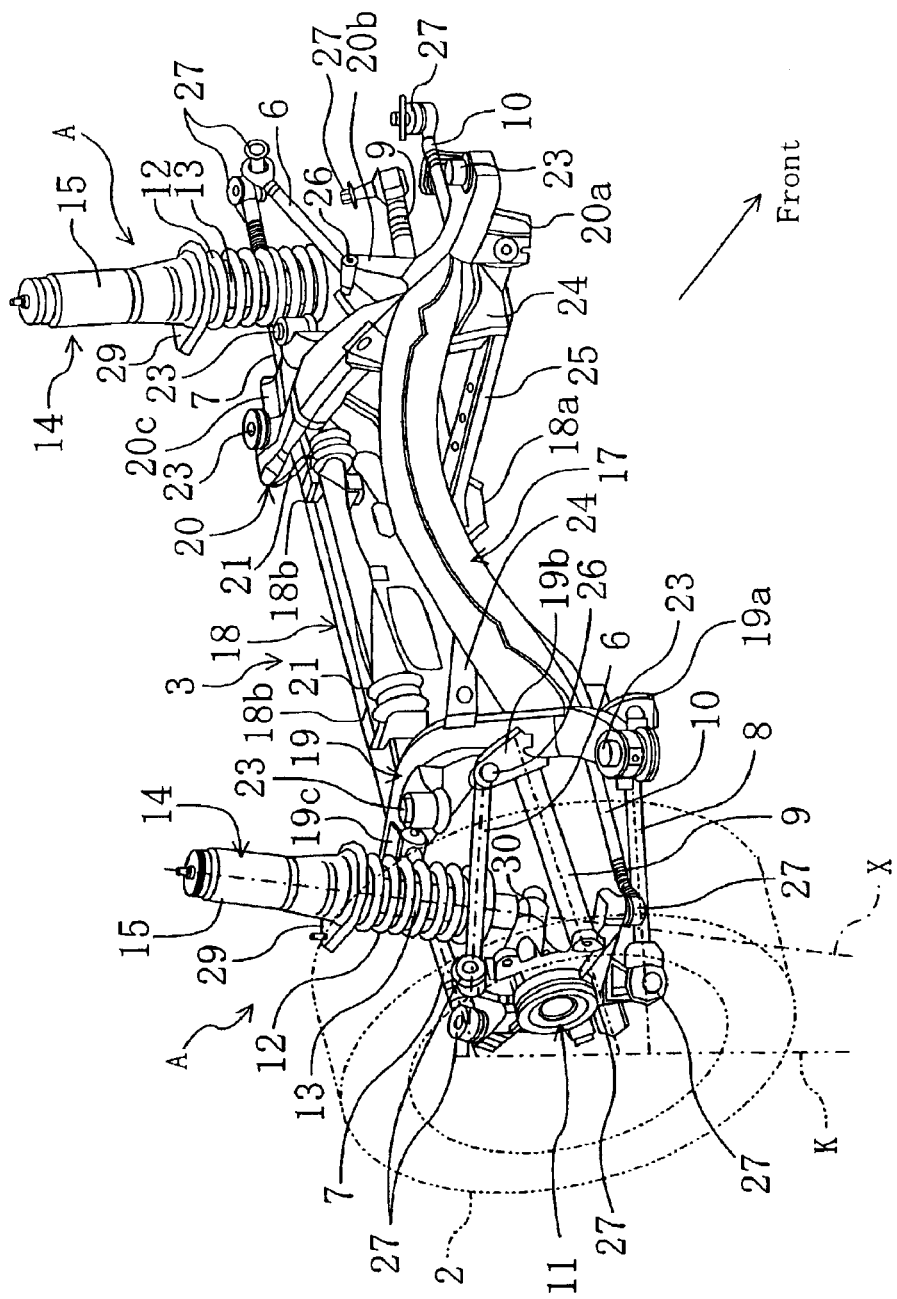
FIG. 1 is a perspective view of a rear suspension assembly which is an embodiment of an automotive rear suspension system according to the present invention.
Figure 2:
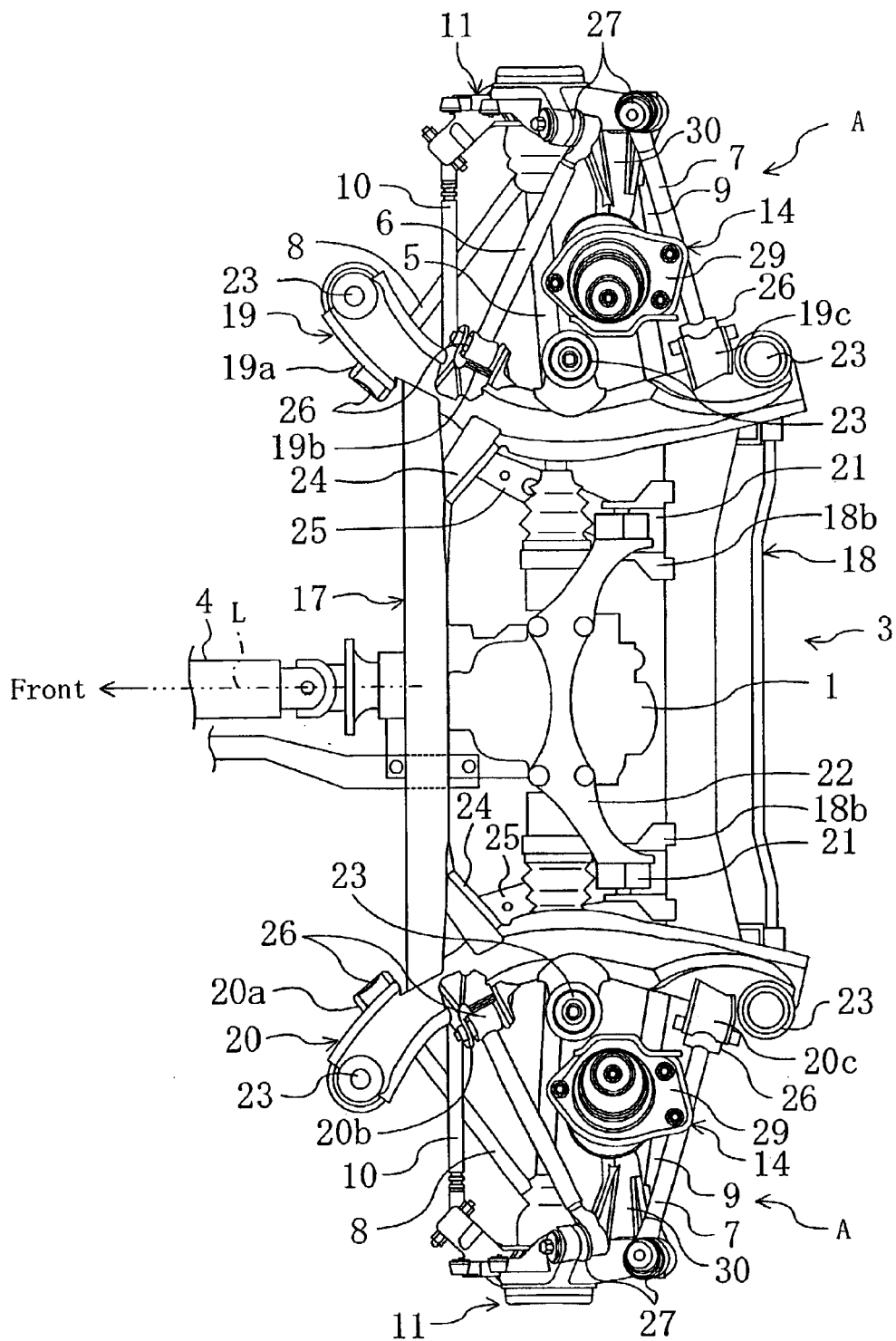
FIG. 2 is a top view of the rear suspension assembly with power transmission members connected thereto.

FIGS. 1 and 2 show an embodiment of an automotive rear suspension system (hereinafter, referred to as a rear suspension) A according to the present invention. The vehicle in this embodiment is a rear drive car in which an engine is mounted in an engine room in the front of the vehicle body, although not shown, and a differential gear 1 (shown only in FIG. 2) is disposed in the rear of the vehicle body to drive rear wheels 2 (only the vehicle body right side one shown in FIG. 1). FIG. 1 is a perspective view of a rear suspension assembly formed of a pair of right and left rear suspensions A, A and a sub frame 3 when viewed from obliquely rightward of the vehicle body front. FIG. 2 is a top view of the rear suspension assembly to which power transmission members including the differential gear 1 are assembled. In FIG. 2, the reference numeral 4 denotes a propeller shaft for transmitting the power output from a transmission to the differential gear 1, and the referential numerals 5, 5 denote drive shafts for transmitting the power output from the differential gear 1 to the rear wheels 2, 2, respectively.

The suspension system A of this embodiment is of multi-link type in which a wheel support (support member) 11 for a rear wheel 2 is coupled for stroke motion to the vehicle body via five independent I-links 6–10. The multi-link suspension includes: two upper links 6 and 7 which are located toward the front and rear of the vehicle body, respectively, and constitute suppositive upper arms; two lower links 8 and 9 which are located toward the front and rear of the vehicle body, respectively, and constitute suppositive lower arms; and a toe control link 10 for restricting the turning displacement of the rear wheel 2 about a suppositive kin pin axle K determined by the geometry of the suppositive upper and lower arms. In this structure, when the upper links 6 and 7 and the lower links 8 and 9 swing up and down about their vehicle body side ends, the wheel support 11 and the rear wheel 2 stroke up and down along a predetermined trajectory.

Furthermore, a damping device 14 formed of a coil spring 12 and a damper 13 is disposed to allow the strokes of the rear wheel 2 and concurrently apply an adequate urging or damping force to the rear wheel 2. This damping device 14 has substantially the shape of a vertically elongated cylinder in which the coil spring 12 and the damper 13 are substantially coaxially arranged. The damping device 14 is provided at the upper end with a cylindrical bracket 15 which is mounted to the vehicle body (not shown). The lower end of the damper 13 (i.e., the lower end of the damping device 14) is pivoted to a portion of the wheel support 11 located toward the inside of the vehicle body. In this manner, the wheel support 11 directly experiences a distributed load of the vehicle body rear side and a reaction force of the coil spring 12 (a vertical reaction force of the damping device) corresponding to a stroke of the rear wheel 2.

Sub Frame Structure

The sub frame 3 is broadly classified into four steel members: front and rear cross members 17 and 18 extending in a vehicle widthwise direction and a pair of side cross members 19 and 20 which are located at right and left sides of the vehicle body to extend in a vehicle longitudinal direction and connect the side members at their right and left ends. The sub member 3 is obtained by assembling the four steel members substantially in the shape of a rectangular frame when viewed horizontally. The front cross member 17, when viewed from above the vehicle body, extends substantially straight in the vehicle widthwise direction, and is joined at its vehicle widthwise both ends to the front ends of the right and left side cross members 19 and 20. When viewed in the longitudinal direction of the vehicle body, the front cross member 17 has a generally bowed shape so that its lengthwise middle portion is located above right and left ends. The right and left ends of the front cross member 17 are provided with seats (not shown) extending downward in the vicinity of the junctions with the side cross members 19 and 20, respectively. The vehicle body side ends of the toe control links 10, 10 are mounted to the seats, respectively.

The rear cross member 18, when viewed from above the vehicle body, extends substantially straight in the vehicle widthwise direction, and is joined at its vehicle widthwise both ends to the rear ends of the right and left side cross members 19 and 20. When viewed in the longitudinal direction of the vehicle body, the rear cross member 18 has an inverted trapezoidal form whose upper edge is longer than the lower edge. Mounting parts 18a, 18a extending downward from right and left ends of the lower edge are formed so that the vehicle body side ends of the rear side lower links 9, 9 are mounted thereto. The upper edge of the rear cross member 18 is provided with seats 18b, 18b located to correspond to the mounting parts 18a, 18a for the rear side lower links 9, 9. The differential gear 1 is suspended by a bracket 22 (shown only in FIG. 2) mounted to the seats 18b, 18b through resilient mounts 21, 21.

Each of the right and left side cross members 19 and 20 is gently bowed so that the lengthwise middle portion is located closer to the inside of the vehicle body than both ends. When viewed from the side of the vehicle body, each side cross member 19, 20 extends horizontally from its rear end to its approximately middle portion and the remaining front side portion then extends obliquely downwardly toward the front of the vehicle body, so that the front side portion is positioned at lower levels than the rear side portion. The front side portions of the side cross members 19 and 20 are provided with first seats 19a and 20a, respectively, to extend downwardly at respective positions near to and frontward from the junctions with the front cross member 17. The vehicle body side ends of the front side lower links 8 and 8 are mounted to the first seats 19a and 20a, respectively. Furthermore, the front side portions of the side cross members 19 and 20 are provided with second seats 19b and 20b, respectively, to extend upwardly at respective positions near to and rearward from the junctions. The vehicle body side ends of the front side upper links 6 and 6 are mounted to the second seats 19b and 20b, respectively. The rear side portions of the side cross members 19 and 20 are provided with third seats 19c and 20c to which the vehicle body side ends of the rear side upper links 7 and 7 are mounted, respectively.

Furthermore, in each of the side cross members 19 and 20, resilient mounts 23, 23, . . . for resiliently supporting the entire sub frame 3 to the vehicle body are disposed at three points: the front end, the approximately midpoint and the rear end. The resilient mount 23 at the approximately midpoint is disposed on the upper surface of a mount attaching part extending from the approximately midpoint of each side cross member 19, 20 toward the inside of the vehicle body, and is arranged so that the line passing through the resilient mount 23 at the approximately midpoint and the resilient mount 23 at the rear end is substantially parallel with the center line L of the vehicle body extending in the lengthwise direction (shown only in FIG. 2), when viewed from above the vehicle body. The resilient mount 23 at the front end is located toward the outside of the vehicle body as compared with the other resilient mounts 23 and 23.

To sum up, the sub frame 3 is connected to the vehicle body through three resilient mounts at each of the right and left sides of the vehicle body or a total of six resilient mounts 23, 23, . . . in all, and the three resilient mounts 23, 23, 23 at the front end, the approximately midpoint and the rear end of the each side cross member 19, 20 are arranged so as not to be aligned when viewed from above. When the sub frame 3 is thus mounted to the vehicle body by the total of six resilient mounts 23, 23, . . . , the distributed load of each resilient mount 23 is reduced as compared with the general case of all four resilient mounts, which enables the use of resilient mounts having relatively soft damping characteristics as a whole and hence improves ride quality. Furthermore, three resilient mounts 23, 23, 23 at each side define a suppositive plane. Therefore, when a side force is input to the rear wheel 2, vibration of the entire sub frame 3 can be effectively suppressed. This substantially eliminates a change of alignment of the rear wheels 2, 2 due to the vibration.

In FIGS. 1 and 2, the reference numeral 24 denotes a reinforcing member bridged from each end portion of the front cross member 17 to the front side portion of each side cross member 19, 20, and the reference numeral 25 denotes a reinforcing member bridged like a brace from the lower end of each reinforcing member 24 to the lower edge of the rear cross member 18.

Suspension System Geometry

Next, detailed description will be described about the geometry of the links 6–10 in the suspension system A at the vehicle body right side with reference to FIGS. 3 to 5. First, when viewed from above the vehicle body in FIG. 3, the front side upper link 6 is connected at the vehicle body side end to the second seat 19b of the side cross member 19 through a rubber bush (resilient bush) 26, extends inclined rearward so as to be located gradually rearward as it proceeds from the second seat 19b to the outside of the vehicle body, and is then connected at the wheel side end to the wheel support 11 through a ball joint 27. Secondly, the rear side upper link 7 has substantially the same length as the front side upper link 6. The rear side upper link 7 is connected at the vehicle body side end to the third seat 19c of the side cross member 19 through a rubber bush 26, extends inclined frontward so as to be located gradually frontward as it proceeds from the third seat 19c to the outside of the vehicle body, and is then connected at the wheel side end to the wheel support 11 through a ball joint 27.

Thirdly, the front side lower link 8 is longer than the upper links 6 and 7. The front side lower link 8 is connected at the vehicle body side end to the first seat 19a of the side cross member 19 through a rubber bush 26, is connected at the wheel side end to the wheel support 11 through a ball joint 27, and is inclined rearward to a larger extent than the front side upper link 6 when viewed from above the vehicle body. Fourthly, the rear side lower link 9 is still longer than the front side lower link 8. The rear side lower link 9 is connected at the vehicle body side end to the fitting part 18a of the rear cross member 18 through a rubber bush 26, extends slightly frontward from the fitting part 18a toward the outside of the vehicle body, and is connected at the wheel side end to the wheel support 11 through a ball joint 27.

Figure 6:
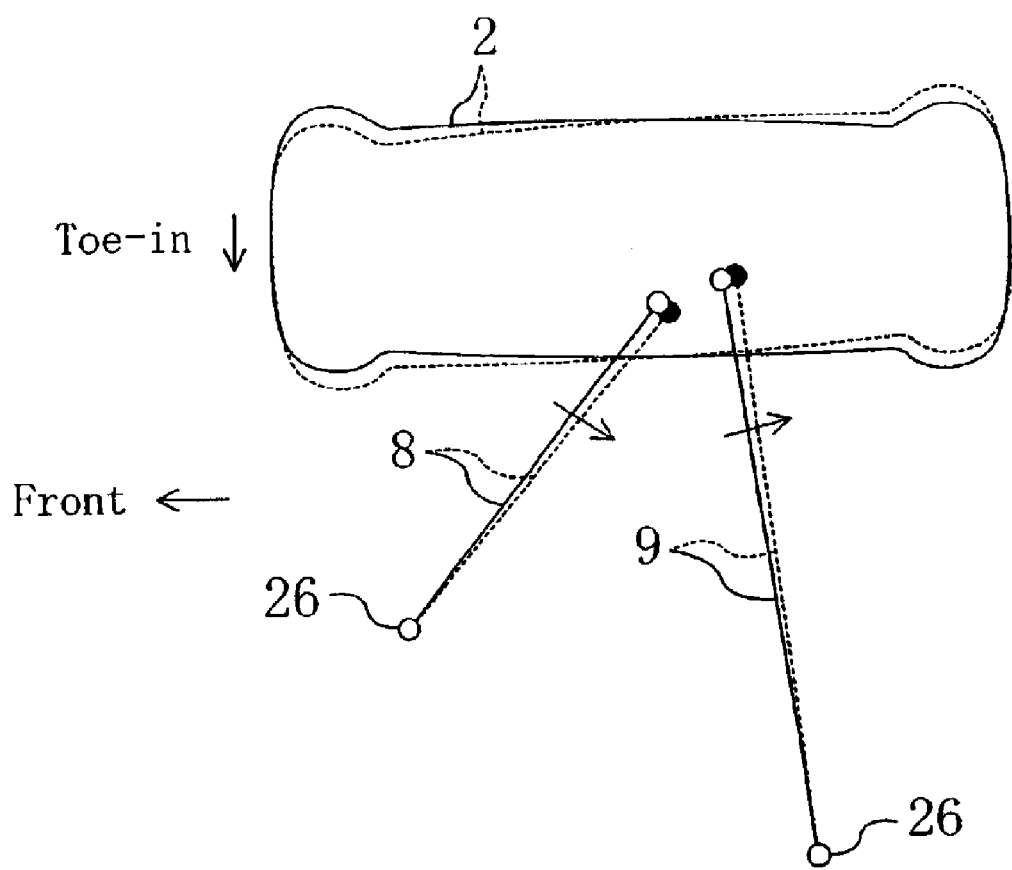
FIG. 6 is a diagram illustrating longitudinal force compliance steering implemented by an arrangement of lower links.

In other words, the two lower links 8 and 9 are arranged to come close to each other toward the outside of the vehicle body when viewed from above the vehicle body. This arrangement allows the rear wheels 2, 2 to geometrically desirably toe-in when they are displaced toward the rear of the vehicle body (longitudinal force compliance steering). More specifically, when a braking force from the road surface acts on the rear wheel 2 toward the rear of the vehicle body during vehicle braking, the two lower links 8 and 9 are slightly angularly displaced about their vehicle body side ends due to deflection of the rubber bushes 26 as schematically shown in FIG. 6. As a result, the wheel side ends of the lower links 8 and 9 are displaced toward the rear of the vehicle body. At the time, if the front side lower link 8 is disposed inclined rearward toward the outside of the vehicle body and the rear side lower link 9 is disposed inclined frontward toward the outside of the vehicle body, angular displacements of the links allow, as shown in the broken lines in FIG. 6, the wheel side ends of the front side lower link 8 to displace toward the inside of the vehicle body and the wheel side ends of the rear side lower link 9 to displace toward the outside of the vehicle body. Thus, the alignment of the rear wheel 2 is turned to toe-in.

In order to achieve such compliance steering as described above, it is not always necessary to incline the front side link rearward and incline the rear side link frontward, but it is essential only to arrange the two links to come close to each other toward the outside of the vehicle body when viewed from above the vehicle body. Alternatively, even if the two links are parallel with each other, it is possible to achieve longitudinal force compliance steering in toe-in alignment by varying the link length one link from the other, for example, making the length of the front side link shorter than that of the rear side link. Furthermore, in this embodiment, the two upper links 6 and 7 are arranged in the same manner as the lower links 8 and 9. The compliance steering for the upper links, however, can be substantially disregarded since the rubber bushes 26 and 26 for the upper links 6 and 7 are very hard and deflect very lightly as described later.

Figure 3:
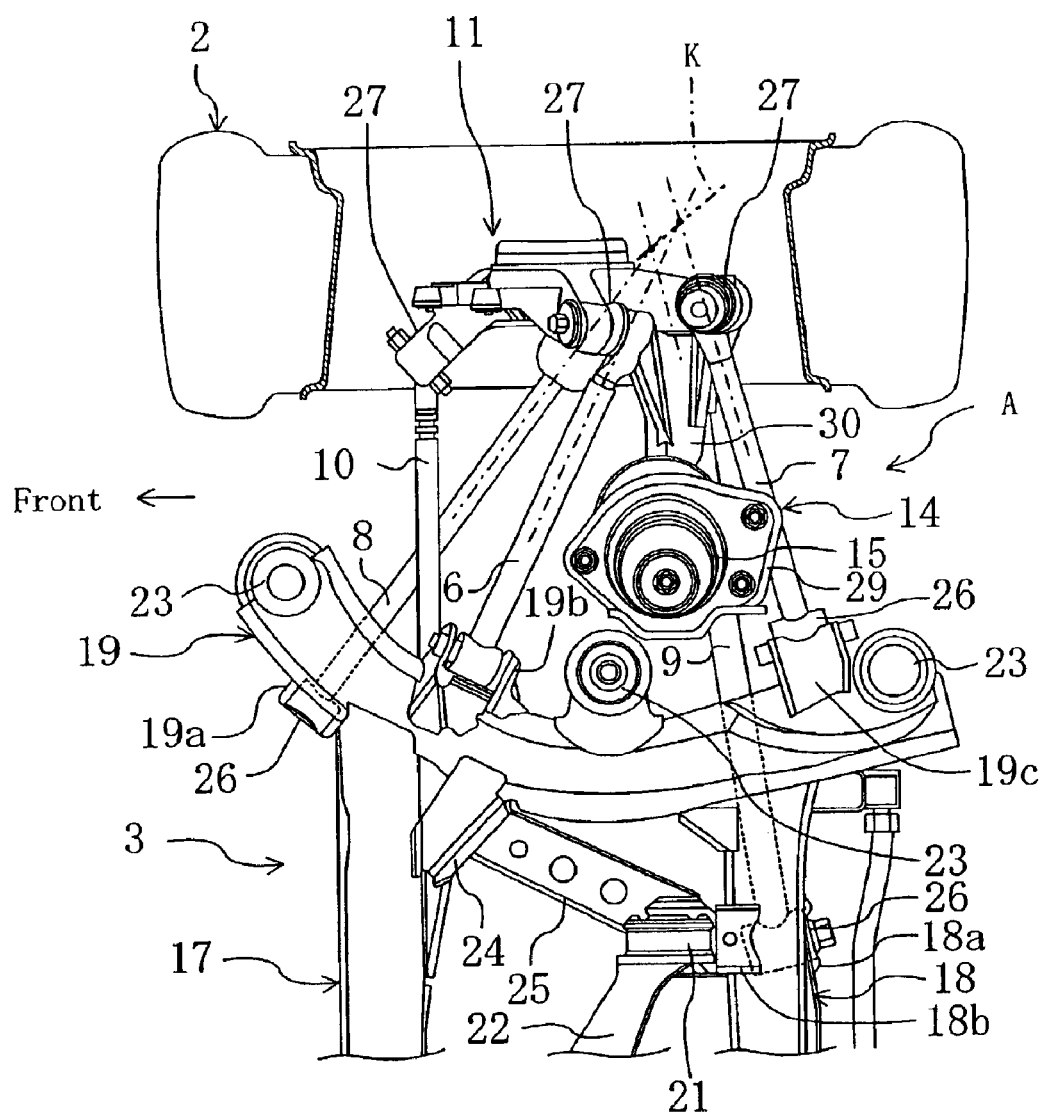
FIG. 3 is a top view of a rear suspension located at the right side of the vehicle body.

Lastly, when viewed from above the vehicle body in FIG. 3, the toe control link 10 is connected at the vehicle body side end to the seat (not shown) of the front cross member 17 through a rubber bush 26, extends substantially abeam (in the vehicle widthwise direction) from the seat toward the outside of the vehicle body, and is connected at the wheel side end to the wheel support 11 through a ball joint 27. Furthermore, when viewed from the rear of the vehicle body in FIG. 5, the upper links 6 and 7 are inclined slightly upward from the side cross member 19 toward the wheel support 11 located toward the outside of the vehicle body. On the contrary, the front side lower link 8 is inclined slightly downward toward the outside of the vehicle body, and the rear side lower link 9 and the toe control link 10 extend substantially horizontally.

The suppositive king pin axle K of the rear wheel 2 is the instantaneous suspension center of turn thereof in a steering direction (toeing direction). When viewed from above the vehicle body, the suppositive king pin axle K is a suppositive axis passing through the intersection of the axes of the two upper links 6 and 7 and the intersection of the axes of the two lower links 8 and 9, as shown in the imaginary line in FIG. 3. In this embodiment, when viewed from the side of the vehicle body as in FIG. 4, the suppositive king pin axle K of the rear wheel 2 is inclined slightly rearward so that its portion closer to the upper end is located closer to the rear of the vehicle body. On the other hand, when viewed in the longitudinal direction of the vehicle body, it is inclined so that its portion closer to the upper end is located closer to the outside of the vehicle body (see FIG. 5).

The intersection k1 of the suppositive king pin axle K and the road surface when viewed from the side of the vehicle body (see FIG. 4) is spaced rearward apart from the contact point G of the rear wheel 2 with the road surface; the caster trail amount of the rear wheel 2 is a negative value. Therefore, a side force acting on the contact point G of the rear wheel 2 with the road surface during the vehicle cornering passes the point closer to the front of the vehicle body than the suppositive king pin axle K. The side force thereby causes a moment toward toe-in to directly act on the rear wheel 2. As a result, mainly, the rubber bushes 26 and 26 of the two lower links 8 and 9 deflect to increase the amount of toe-in of the rear wheel 2 (side force compliance steering).

To sum up, during vehicle braking, the rear suspension A of this embodiment allows the right and left rear wheels 2 and 2 to increase their amounts of toe-in by longitudinal force compliance steering, while during vehicle turning, it allows the outside rear wheel 2 to increase the amount of toe-in by side force compliance steering. Although not described in detail, the geometry of the links 6–10 of this rear suspension A allows the rear wheel 2 to increase the amount of toe-in also by roll steering during vehicle bump.

Next, the location of the damping device 14 will be described. When viewed from above the vehicle body in FIG. 3, the damping device 14 is located to vertically pass through between the front side links 6, 8 and the rear side links 7, 9. The axis X of the damping device 14 extends substantially vertically when viewed from the side of the vehicle body (see FIG. 4), and is inclined so that its portion closer to the upper end is located closer to the inside of the vehicle body when viewed from the rear of the vehicle body (see FIG. 5). In the upper end part of the damping device 14, as shown in the broken lines only in FIG. 4, the upper end part of a rod 13a of the damper 13 is contained in the cylindrical bracket 15 and fixed to the upper end of the bracket 15 through a rubber bush or the like, and a cylindrical resin-made bump stopper 28 is disposed coaxially with the rod 13a to extend downward from the upper end of the bracket 15. When the suspension system A takes a bump to compress the coil spring 12 beyond a predetermined amount, the bump stopper 28 functions as an auxiliary spring by abutting on the upper end of the outer cylinder of the damper 13. After the abutment of the bump stopper 28, the spring constant of the entire damping device 14 is increased one step, which restricts the approaching displacement of the rear wheel 2 to the vehicle body.

Furthermore, the lower end of the bracket 15 of the damping device 14 is provided with a profiled flange 29 elongated particularly in the vehicle lengthwise direction. The top surface of the flange 29 is abutted on and fastened to a lower frame of the vehicle body. On the other hand, the bottom surface of the flange 29 is formed into an upper seat against which bears the upper end of the coil spring 12 disposed to surround the outer cylinder of the damper 13. The lower end of the coil spring 12 bears against a lower seat 13b provided at the lower part of the damper 13 outer cylinder. Moreover, an annular fitting part 13c is extended from the lower end of the damper 13 and is pivoted to one end of a connecting part 30 extending from the wheel support 11 of the rear wheel 2 toward the inside of the vehicle body.

More specifically, the connecting part 30 of the wheel support 11 is formed integrally with the inner surface of the wheel support 11 body through which the axle of the rear wheel 2 passes. The connecting part 30, when viewed in the vehicle longitudinal direction in FIG. 5, has upper and lower arms 31 and 32 that extends from the upper and lower ends of the wheel support 11 body toward the inside of the vehicle body and that are combined together at their ends remote from the wheel support body, and an intermediate arm 33 extending vertically to connect the upper and lower arms 31 and 32 between their intermediate points, thereby taking substantially the general form of a laterally oriented "A". Furthermore, a steel fulcrum pin 34 is disposed across the intermediate arm 33 which is the lateral bar of the A-form, and the remote ends of the upper and lower arms 31 and 32 which form the upper end of the A-form (the end of the connecting part 30 toward the inside of the vehicle body). One end of the fulcrum pin 34 extends beyond the end of the connecting part 30 toward the inside of the vehicle body, is inserted into the fitting part 13c at the lower end of the damper 13, and is fitted into the fitting part 13c through a rubber bush or the like. Forming the connecting part 30 in such substantially an A-form provides reduced weight of the connecting part 30 and hence the entire wheel support 11, and minimizes the increase of unsprung weight due to provision of the connecting part 30 to prevent the deterioration of vehicle kinetic performance, while ensuring sufficient rigidity of the connecting part 30 against vertical load.

By mounting the upper end part of the damping device 14 to the lower frame of the vehicle body through the bracket 15 as described above, most of a force input from the rear wheel 2 into the damping device 14 is transmitted to the lower frame of the vehicle body, but substantially no force is transmitted to the upper part of the vehicle body. Therefore, in order to ensure vehicle body rigidity, it is essential to mainly strengthen the lower frame, which enhances vehicle design flexibility. Furthermore, a distributed load of the rear side of the vehicle body and a vertical reaction force of the damping device 14 act directly on the rear wheel 2 through the connecting part 30 of the wheel support 11. Since the lower end of the damper 13 is fitted to the fulcrum pin 34 attached to the connecting part 30 at sufficiently spaced two points, the crossbar (intermediate arm 33) and the top of A-form, as described above, this ensures that the vertical reaction force of the damping device 14 is transmitted to the rear wheel 2.

The principal feature of this invention is that the wheel support 11 is previously urged in a predetermined orientation with positive use of the reaction force from the damping device 14 as described above to optimize the alignment of the rear wheel 2, and apply urging forces in optimal directions to the respective rubber bushes 26, 26, . . . of the links 6–10, such that the multi-link suspension thereby provides a sharp driving feeling applicable for a sports car. More specifically, the vertical reaction force of the damping device 14 is used to: (a) allow a moment toward negative camber to act on the rear wheel 2 to overcome a side force during vehicle cornering; (b) apply a moment toward toe-in to the rear wheel 2 since before the action of a side force during vehicle cornering or the like; and (c) apply an urging force toward the front of the vehicle body to the rubber bushes 26, 26 of the lower links 8, 9 having great effects particularly on ride quality.

Figure 7:
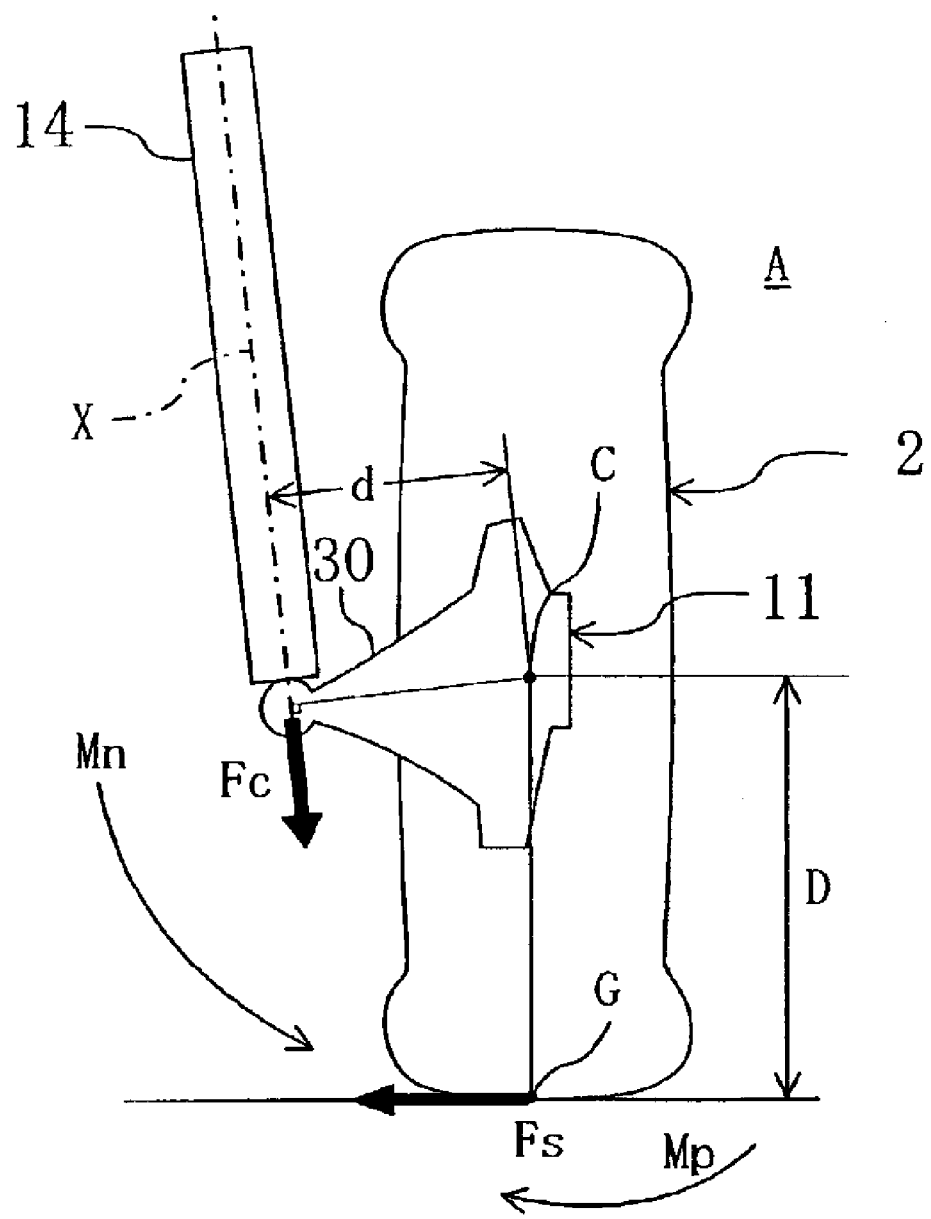
FIG. 7 is a diagram illustrating a moment toward negative camber caused by a vertical reaction force of a damping device.

The above three aspects will be described below one after another. First, when the rear suspension A in the right side of the vehicle body is viewed from the rear of the vehicle body as in the schematic diagram of FIG. 7, the damping device 14 is spaced a relatively great distance apart from the rear wheel 2 toward the inside of the vehicle body so that the reaction force (vertical reaction force) Fc in a direction of its axis X produces a sufficiently large moment Mn toward negative camber on the rear wheel 2 through the wheel support 11, in other words, so that a moment Mn resulting from the vertical reaction force of the damping device 14 has a sufficiently long arm. Specifically, for example, the ratio of the length d of a perpendicular dropped down from the center C of the rear wheel 2 onto the axis X of the damping device 14 (the arm length of a moment Mn toward negative camber resulting from the reaction force of the damping device 14) to the radius D of the rear wheel 2 (the arm length of a moment Mp toward positive camber due to a side force) is a predetermined value or more.

Now, the predetermined value of the above ratio will be considered in detail. The magnitude of a moment Mn toward negative camber acting on the rear wheel 2 by a vertical reaction force Fc of the damping device 14 is represented as the product of the distance from the axis X of the damping device 14 to the rear wheel center C (i.e., the arm length of the moment Mn) and the damping device reaction force Fc. In automotive rear suspensions, however, the distributed load to the outside rear wheel 2 during cornering, the spring constant of the coil spring 12 of the damping device 14, and the maximum grip of the rear wheel 2 are generally set up in order for the vehicle to gain desired cornering performance (for example, maximum lateral acceleration during cornering). These settings roughly determine the damping device reaction force Fc itself.

Therefore, in order to gain a sufficiently large moment Mn toward negative camber, it is necessary in fact to lengthen the moment arm. For example, it can be considered to suppose limit maneuvering conditions of the vehicle in which the maximum lateral acceleration generates on the rear wheel during cornering, and to set the arm length of a moment Mn toward negative camber due to the damping device reaction force Fc so that the moment Mn can be larger than a moment Mp toward positive camber on the rear wheel 2. In other words, it can be considered to set the ratio between the arm length d of a moment Mn toward negative camber on the rear wheel 2 and the arm length D of a moment Mp toward positive camber empirically or otherwise so that in the limit maneuvering conditions due to the side force Fs, the moment Mn can be larger than the moment Mp.

More specifically, during vehicle cornering, a side force Fs generally causes a moment Mp toward positive camber to directly act on the outside rear wheel 2 during cornering, and the moment Mp increases with the side force Fs. On the other hand, in the above-described setting that uses a vertical reaction force Fc of the damping device 14 to allow a moment Mn toward negative camber to act on the rear wheel 2, when the vehicle body increases its lateral acceleration during cornering to increase the roll, the coil spring 12 of the damping device 14 will be compressed to increase its reaction force Fc and also increase the moment Mn toward negative camber due to the reaction force Fc.

Therefore, if the damping device 14 is disposed in the manner of this embodiment so that the initial value of a moment Mn toward negative camber due to a vertical force Fc of the damping device 14 (the value when the vehicle stops or travels straight at a constant velocity) is increased to a certain degree, this allows, even if a moment Mp toward positive camber due to a side force Fs during cornering is increased, a sufficient moment Mn toward negative camber to overcome the increased moment Mp to develop on the rear wheel 2 until the limit of the side force for the rear wheel 2 is reached. Thus, in the rear suspension A for supporting the outside rear wheel 2 during cornering, the rubber bushes 26, 26, . . . of the links 6–10 are subjected to (or previously compressed by) individual forces fixedly directed to urge the rear wheel 2 toward negative camber. As a result, the occurrence of minute wobbles of the rear wheel 2 can be prevented, thereby providing the driver with a sharp driving feeling.

Figure 4:
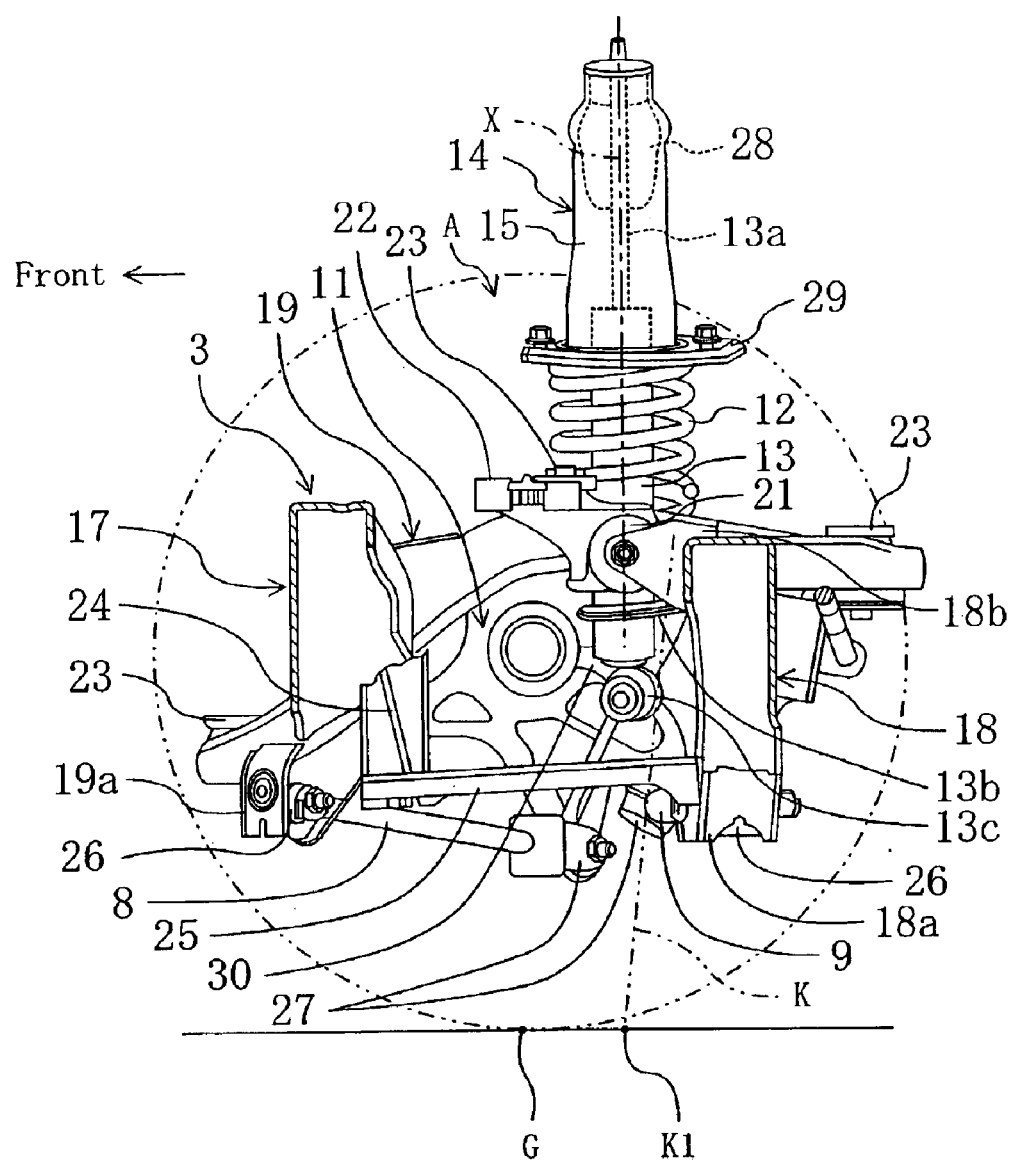
FIG. 4 is a left side view of the rear suspension of FIG. 3.
Figure 5:
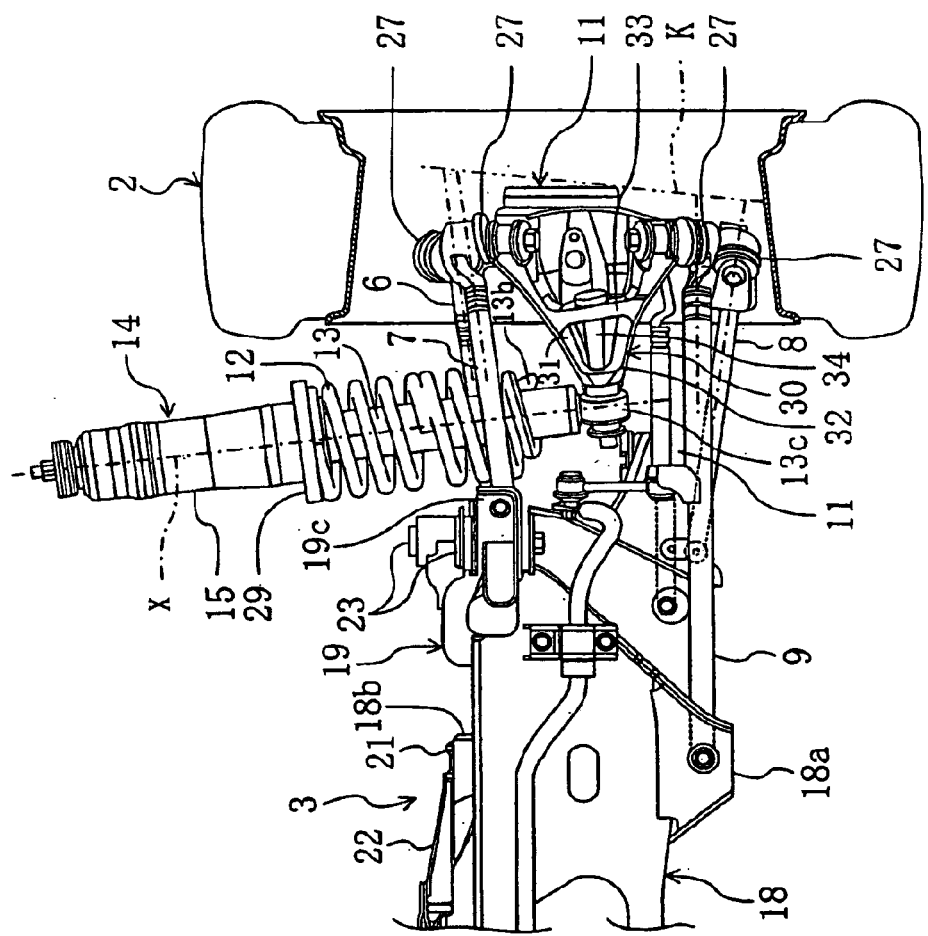
FIG. 5 is a rear view of the rear suspension of FIG. 3.
Figure 8:
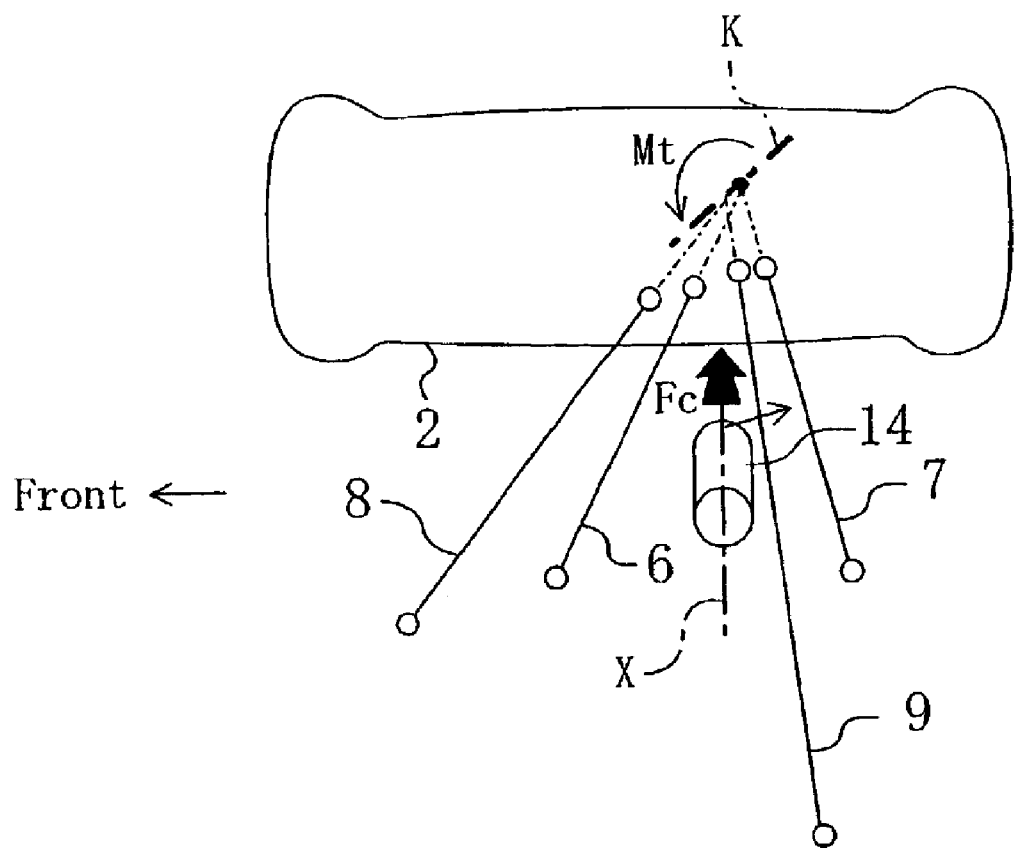
FIG. 8 is a diagram illustrating a moment toward toe-in caused by a vertical reaction force of the damping device.

Second, when the rear suspension A of this embodiment is viewed from the side of the vehicle body as in FIG. 4, the suppositive king pin axle K of the rear wheel 2 is set to incline slightly rearward, and the axis X of the damping device 14 is set to extend substantially in a vertical direction and is placed, at a position inwardly from the suppositive king pin axle K (see FIG. 5), in non-parallel and non-intersecting relation to the suppositive king pin axle K. Thus, when the right rear wheel 2 is viewed from the top of the vehicle body as in the schematic diagram of FIG. 8, the vertical reaction force Fc of the damping device 14 produces a counterclockwise moment, i.e., a moment Mt toward toe-in, about the suppositive king pin axle K. Specifically, the rear wheels 2, 2 are urged toward toe-in using the vertical reaction force of the damping device 14 since before the occurrence of a lateral acceleration or a position change of the vehicle (in initial conditions). Therefore, when a side force acts on the rear wheel 2 in the initial stage of cornering so that a desired amount of toe-in is applied to the rear wheel 2, the response of the suspension system can be prevented from being delayed due to the deflection of the rubber bushes 26, 26, . . . of the links 6–10. This also provides the driver with a sharp driving feeling together with high response and a sense of high rigidity.

Figure 9:
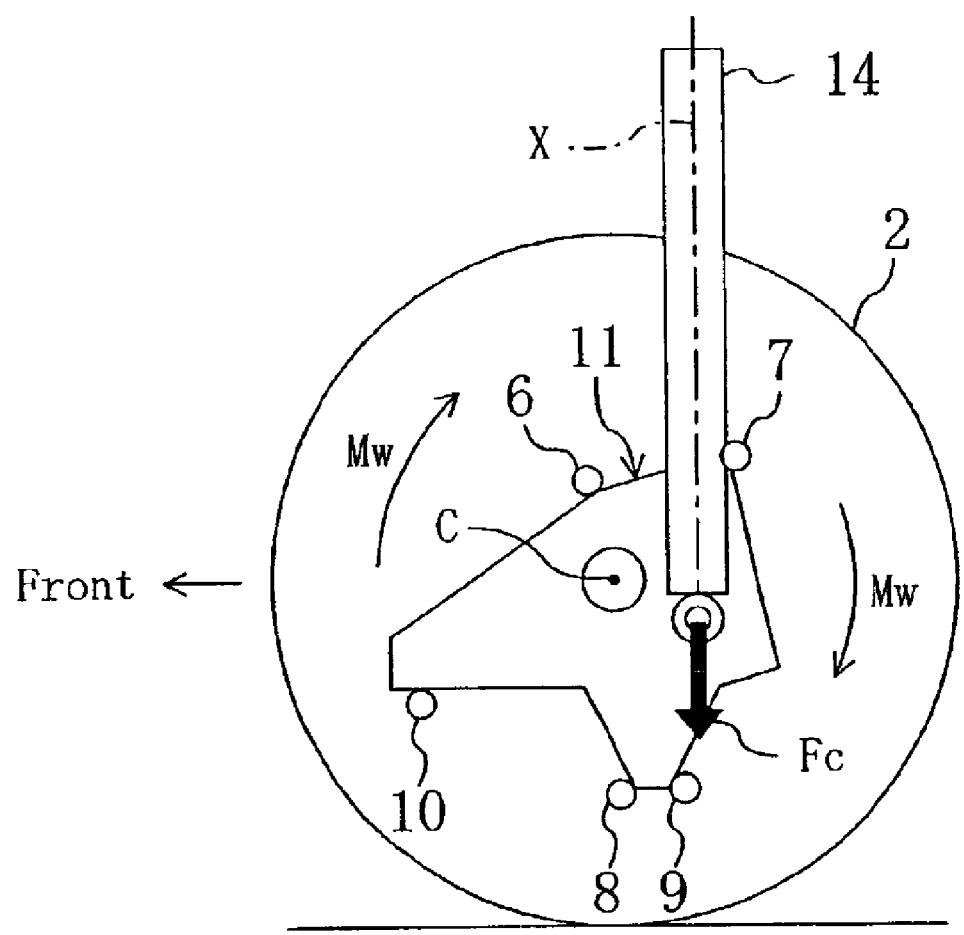
FIG. 9 is a diagram illustrating a moment about an axle caused by a vertical reaction force of the damping device.

Third, in the rear suspension A of this embodiment, as schematically shown in FIG. 9, the axis X of the damping device 14 is set to be located, at a position inwardly from the rear wheel 2, closer to the rear of the vehicle body than the center C of the rear wheel 2 and to extend substantially in the vertical direction. Thus, when viewed from the left of the vehicle body in FIG. 9, the vertical reaction force Fc of the damping device 14 acts, at a position rearward from the center C of the rear wheel 2 (to the right side of the figure), on the wheel support 11 from above substantially along the vertical, which produces a clockwise moment Mw on the wheel support 11. The result is that the upper links 6 and 7 are urged toward the rear of the vehicle body to allow urging forces toward the rear of the vehicle body to act on the rubber bushes 26 of the links 6 and 7, and that the lower links 8 and 9 are urged toward the front of the vehicle body to allow urging forces toward the front of the vehicle body to act on the rubber bushes 26 of the links 8 and 9.

Furthermore, the rubber bushes 26 of the upper links 6 and 7 are extremely hard ones, while the rubber bushes 26 of the lower links 8 and 9 are relatively soft ones. Specifically, relatively soft rubber bushes 26 are used for the lower links 8 and 9 having relatively great effects on ride quality, and the rubber bushes 26 are previously compressed toward the front of the vehicle body by the vertical reaction force of the damping device 14. In this condition, almost no allowance is left for deflection of the rubber bushes 26 toward the front of the vehicle body. Therefore, when a force toward the front of the vehicle body (for example, a driving force) is applied to the rear wheel 2, the force is transmitted to the vehicle body with the rubber bushes 26 hardly deflected. This improves vehicle acceleration response.

On the other hand, when a force toward the rear of the vehicle body (for example, s shock from an uneven road surface) is input to the rear wheel 2 with the rubber bushes 26 pre-compressed toward the front of the vehicle body as described above, the rubber bushes 26 are not deflected opposite to the initial conditions, i.e., rearward, to displace the rear wheel 2 toward the rear of the vehicle body until the input force makes the force on each rubber bush 26 greater than the above-mentioned urging force and hence the resultant of the forces is inverted in direction. Namely, a shock from an uneven road surface or the like is transmitted late to the vehicle body or absorbed by the rubber bushes.

Workings and Effects

Next, description will be made about the workings and effects of the rear suspension A of this embodiment having the above structure. First, when the vehicle stops or travels straight at a constant speed, forces corresponding to distributed load for the rear side of the vehicle body act through the damping devices 14 on the wheel supports 11 of the rear wheels 2 in the right and left suspensions A, A, respectively, and moments toward negative camber and toe-in act on the corresponding rear wheels 2 (initial conditions). Then, when the straight moving vehicle is steered right or left by the driver, side forces occur on the front and rear wheels so that the vehicle shifts into a cornering condition. At the time, the outside rear wheel 2 during cornering increases the amount of toe-in by the side force, and after a slight delay, it also increases the amount of toe-in as a result of vehicle roll, which stabilizes vehicle behavior.

In this case, the rear wheels 2 are previously urged toward negative camber and toe-in even in a straight moving condition. Therefore, when toe-in is applied to each rear wheel 2 by a side force or vehicle roll, the suspension causes no delay due to the deflection of the rubber bushes 26, 26, . . . of the links 6–10, and thereby provides a sharp driving feeling involving a sense of highest rigidity and the least phase delay ever experienced as a multi-link suspension system. In addition, since the outside rear wheel 2 during cornering is urged consistently from the straight moving condition to the initial stage of cornering, this provides a natural driving feeling and a sense of high stability.

Subsequently, when the lateral acceleration of the vehicle during cornering is increased to increase the side force on the rear wheel 2, the increased side force and roll steering increase the amount of toe-in and the amount of bump in the rear suspension A. With the increase of the amount of bump, the reaction force of the damping device 14, i.e., the reaction force of the coil spring 12, is substantially proportionally increased, which thus increases the moment toward toe-in. When the amount of bump is further increased, the top end of the outer cylinder of the damper 13 abuts on the bump stopper 28. This suppresses the roll of the vehicle to suppress increase in the amount of toe-in of the rear wheel 2 due to roll steering. Concurrently, the spring constant of the entire damping device 14 is one step further increased to thereby abruptly increase the reaction force of the damping device 14. Therefore, the moment toward toe-in is synergistically increased. In other words, when the bump stopper 28 suppresses the roll of the vehicle to suppress increase in the amount of toe-in of the rear wheel 2 due to roll steering, the moment toward toe-in is abruptly increased by the reaction force of the damping device 14. Therefore, the amount of toe-in of the rear wheel 2 is never abruptly changed. As a result, a behavior change of the vehicle in limit maneuvering conditions can be suppressed to provide improved running stability.

Furthermore, with the increase of the lateral acceleration during cornering, the moment toward positive camber on the rear wheel 2 is increased by the side force. In this case, with the increase of the lateral acceleration, the vertical reaction force of the damping device 14 is also increased so that the moment toward negative camber acts on the outside rear wheel 2 during cornering until the limit maneuvering conditions due to the side force are reached. Therefore, the rubber bushes 26, 26, . . . of the links 6–10 for the outside rear wheel 2 during cornering always experience urging forces fixed in respect of the direction of camber change of the rear wheel 2 (the lateral direction of the vehicle body). This prevents minute wobbling of the rear wheel 2, thereby providing the sharpest driving feeling ever experienced as a multi-link suspension system.

Figure 10A:
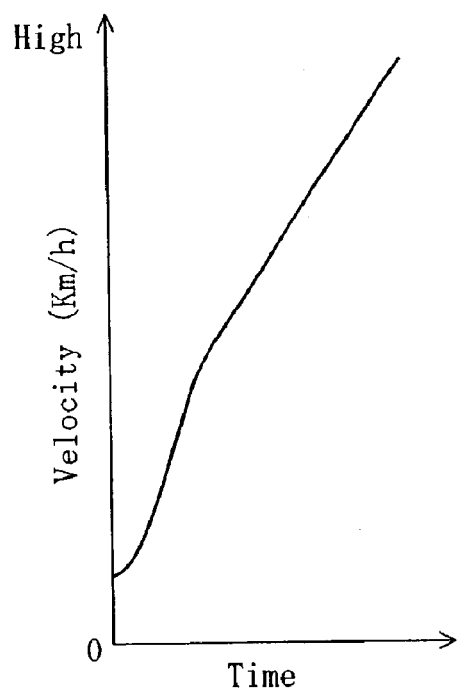
FIGS. 10A and 10B are graphs showing changes of vehicle velocity and lateral acceleration with time in a vehicle cornering test, respectively.
Figure 10B:
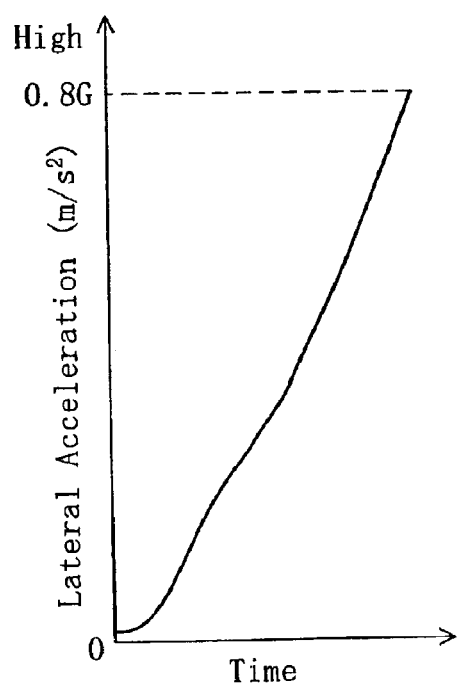
Figure 11A:
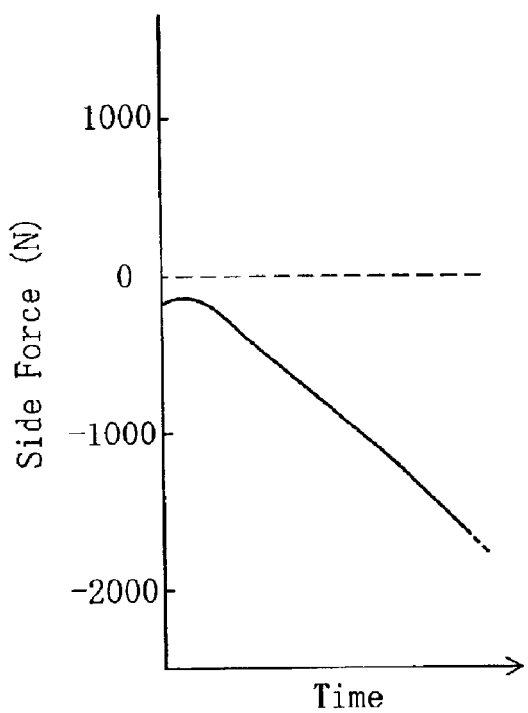
FIGS. 11A and 11B are graphs showing changes of side force and longitudinal force on a rubber bush for a front side upper link in a vehicle cornering test, respectively.
Figure 11B:
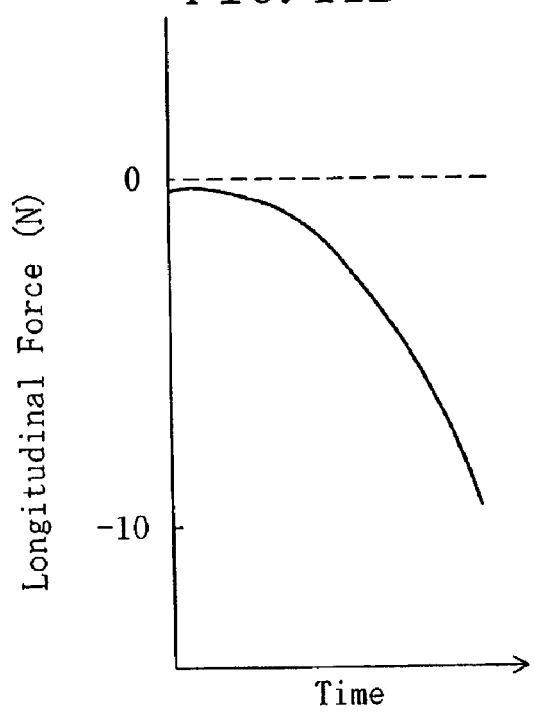

In this regard, experimental results will be described which was obtained by gradually increasing the vehicle velocity with the steering angle kept approximately steady and continuing to measure urging forces on the respective rubber bushes 26, 26, . . . of the suspension links 6–10 for the outside rear wheel 2 during cornering until the vicinity of grip limit is reached. FIGS. 10A and 10B are graphs showing the change of vehicle velocity with time and the change of lateral acceleration with time, respectively. First, as shown in these figures, in this experiment, the vehicle velocity was relatively abruptly increased halfway, and then slightly gently increased to a predetermined vehicle velocity. During the time, the lateral acceleration was relatively steeply increased halfway with the increase of vehicle velocity, and then slightly gently increased to a grip limit of the rear wheel 2 at about 0.8 G (wherein G is the gravity).

As shown in the graphs of FIGS. 11 to 15, with the above changes of vehicle velocity and lateral acceleration, urging forces on the rubber bushes 26 of the front side upper link 6, rear side upper link 7, front side lower link 8, rear side lower link 9 and toe control link 10 were changed. First, for the front side upper link 6, as shown in FIG. 11A, it experienced in the initial conditions an urging force of about 200 N in a laterally negative direction, i.e., toward the outside of the vehicle body. When the vehicle velocity and the lateral acceleration were increased with time, the absolute value of the urging force temporarily decreased, then increased, and finally reached, in the vicinity of grip limit, about 1600 N as an urging force toward the outside of the vehicle body. Furthermore, as shown in FIG. 11B, the urging force in the vehicle longitudinal direction was substantially zero in the initial conditions, and then increased toward the rear of the vehicle body with the increase of vehicle velocity and lateral acceleration.

Figure 12A:
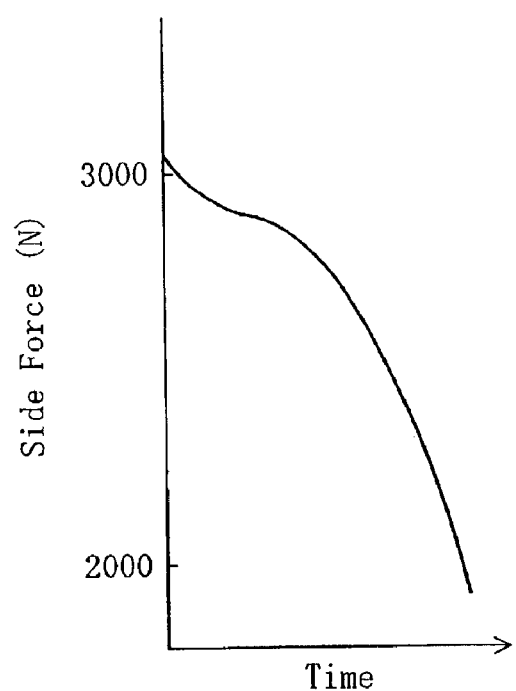
FIGS. 12A and 12B are graphs for a rear side upper link corresponding to FIG. 11.
Figure 12B:
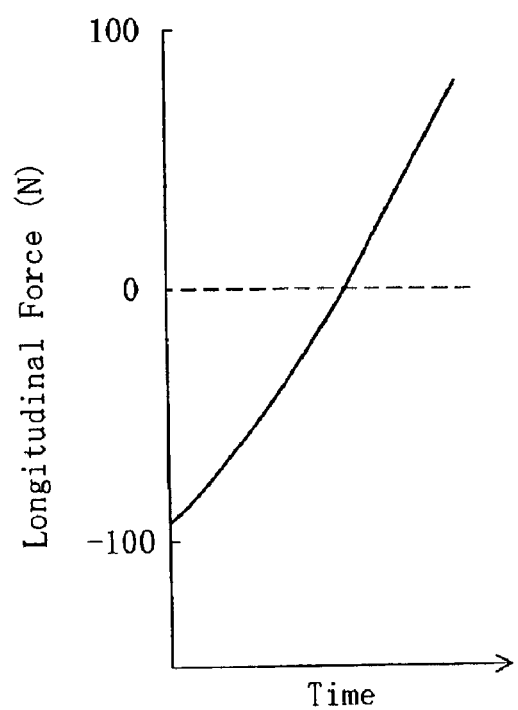

Next, for the rear side upper link 7 as shown in FIG. 12, it experienced in the initial conditions an extremely large urging force of 3000 N or more toward the inside of the vehicle body in respect of the vehicle lateral direction and an urging force of about 100 N toward the rear of the vehicle body. Thereafter, with the increase of vehicle velocity and lateral acceleration, the lateral urging force decreased and then reached, in the vicinity of grip limit, about 1900 N as an urging force toward the inside of the vehicle body.

Figure 13A:
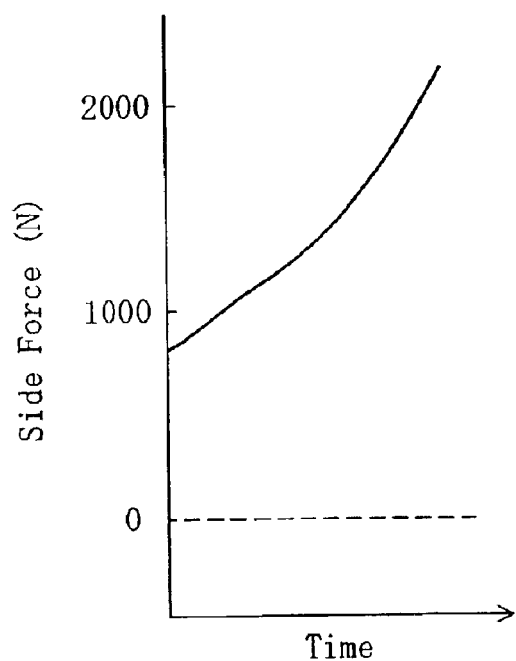
FIGS. 13A and 13B are graphs for a front side lower link corresponding to FIG. 11.
Figure 13B:
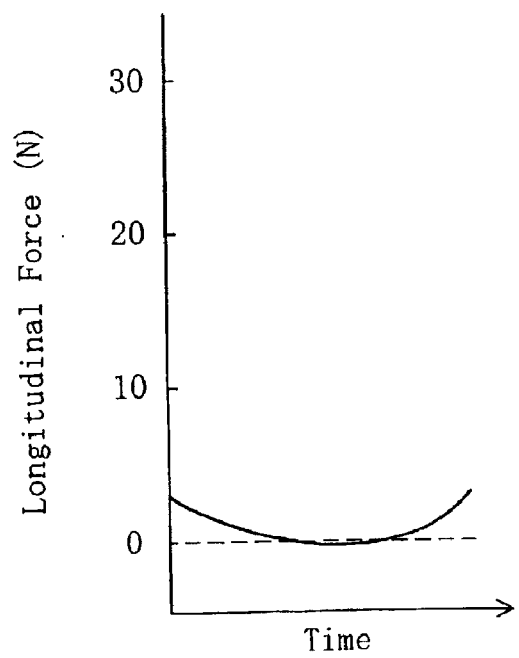

Similarly, for the front side lower link 8 as shown in FIG. 13, it experienced in the initial conditions an urging force of about 800 N toward the inside of the vehicle body in respect of the vehicle lateral direction and an urging force of about 2.5 N toward the front of the vehicle body. Thereafter, with the increase of vehicle velocity and lateral acceleration, the lateral urging force increased and then reached, in the vicinity of grip limit, about 2300 N as an urging force toward the inside of the vehicle body.

Figure 14A:
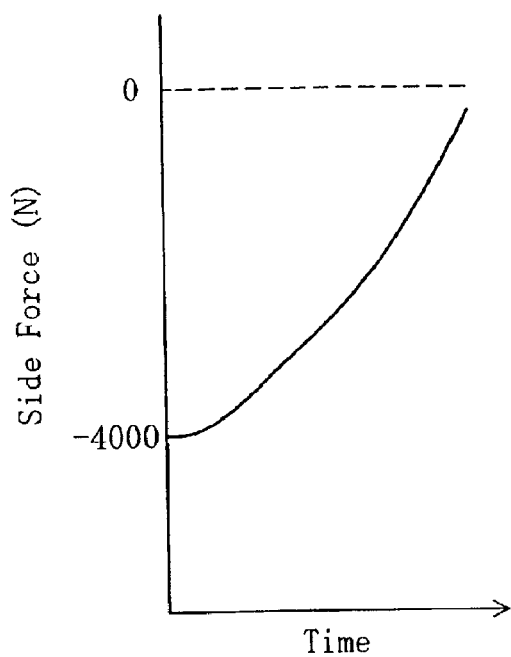
FIGS. 14A and 14B are graphs for a rear side lower link corresponding to FIG. 11.
Figure 14B:
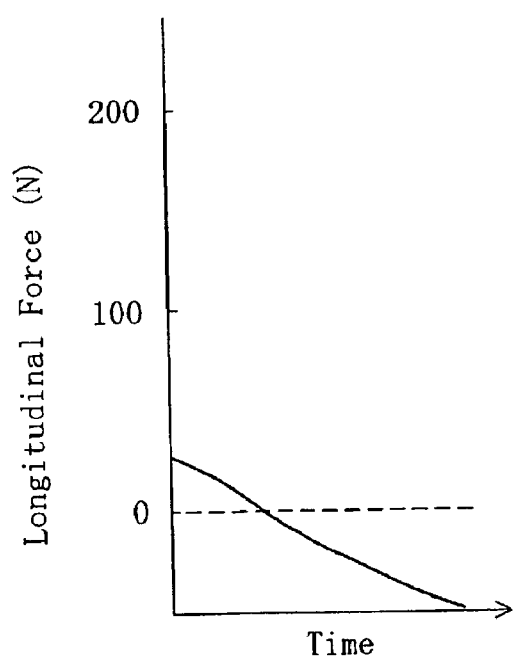

Finally, for the rear side lower link 9 as shown in FIG. 14, it experienced in the initial conditions an urging force of about 4000 N toward the outside of the vehicle body in respect of the vehicle lateral direction and an urging force of about 25 N toward the front of the vehicle body. Thereafter, with the increase of vehicle velocity and lateral acceleration, the lateral urging force decreased and then reached substantially zero in the vicinity of grip limit.

Consideration will be now made about the above experimental results. In the initial conditions, the vertical reaction force of the damping device 14 causes a moment Mn toward negative camber to act on the wheel support 11 (see FIG. 7) and a clockwise moment Mw when viewed from the left of the vehicle body to act on the wheel support 11 (see FIG. 9). The moment Mn toward negative camber acts mainly on the rear side upper and lower links 7 and 9 near to the point of application of the reaction force of the damping device 14. Therefore, an axial compressive force acts on the rear side upper link 7, while an axial tensile force acts on the rear side lower link 9. In addition, the moment Mw also acts as axial compressive and tensile forces on the rear side links 7 and 9, respectively. As a result, the rear side upper link 7 experiences a very large axial compressive force, and hence its rubber bush 26 experiences a very large lateral urging force toward the inside of the vehicle body (3000 N or more). Also, the rear side lower link 9 experiences a very large axial tensile force, and hence its rubber bush 26 experiences a very large lateral urging force toward the outside of the vehicle body (about 4000 N).

On the other hand, for the front side links 6 and 8 largely inclined in the vehicle longitudinal direction as compared with the rear side links 7 and 9, they are less affected by the moment Mn toward negative camber. In addition, the two moments Mn and Mw act axially opposite to each other and are thus offset. As a result, the front side upper link 6 experiences a relatively small axial tensile force, and hence its rubber bush 26 experiences a relatively small lateral urging force toward the outside of the vehicle body (about 200 N). The longitudinal urging force on the rubber bush 26 is substantially zero. The front side lower link 8 experiences a relatively small axial compressive force, and hence its rubber bush 26 experiences a lateral urging force toward the inside of the vehicle body (about 800 N) and a slight urging force toward the front of the vehicle body (about 2.5 N).

Then, when the vehicle velocity and lateral acceleration are increased during vehicle cornering, the urging forces of the rubber bushes 26, 26, . . . are changed correspondingly as shown in the above experimental results. In this case, however, the lateral urging forces of the rubber bushes 26, 26, . . . of all four of the upper and lower links 6–9 do not traverse the origin point (0), but always act in unchanged directions from initial to limit maneuvering conditions of the rear wheel 2. It can be seen from this that in the rear suspension A for a vehicle used for the experiments, the rear wheels 2, 2 during the cornering of the vehicle are always urged toward negative camber, like the initial conditions, until the vicinity of their grip limit is reached.

Figure 15A:
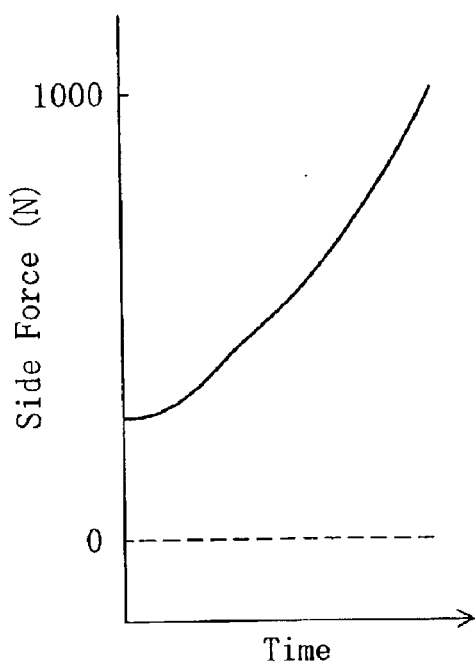
FIGS. 15A and 15B are graphs for a toe control link corresponding to FIG. 11.
Figure 15B:
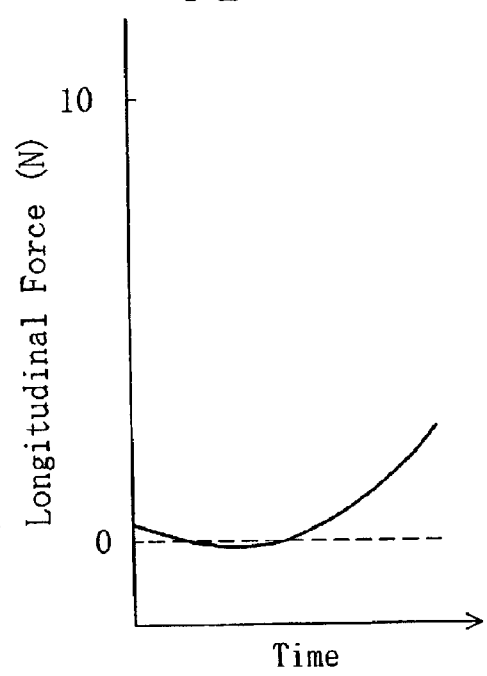

For the toe control link 10, as shown in the graph of FIG. 15, it experienced in initial conditions a lateral urging force of about 300 N toward the inside of the vehicle body, while its longitudinal urging force was substantially zero. Thereafter, with the increase of vehicle velocity and lateral acceleration, the lateral urging force increased and then reached, in the vicinity of grip limit, about 1000 N toward the inside of the vehicle body. It can be seen from this that the rear wheel 2 is urged toward toe-in consistently from initial conditions to the vicinity of grip limit.

Furthermore, in the rear suspension A of this embodiment, relatively soft rubber bushes are selected for, among the five links 6–10, front side and rear side lower links 8 and 9 having great effects particularly on ride quality. In addition, as is apparent from the above experimental results, the rubber bushes 26 and 26 for the two lower links 8 and 9 are each subjected in initial conditions to a weak urging force toward the front of the vehicle body due to the vertical reaction force of the damping device 14. Therefore, even if the rear wheel 2 of the moving vehicle inputs, for example, a shock from an uneven road surface (a shock toward the rear of the vehicle body), the shock is absorbed by the deflection of the rubber bushes 26, 26, which offers a good ride. Moreover, as is apparent from the graphs of FIGS. 13 and 14, it is small urging forces that act on the rubber bushes 26, 26 of the lower links 8 and 9 in initial conditions, and it is a slight urging force (about 2.5 N) that acts on the front-side lower link 8 having great effects particularly on ride quality. Such a slight urging force never interferes with the deflection of the rubber bush 26, and hence the shock can be absorbed very effectively Also, such relatively soft rubber bushes 26, 26 of the lower links 8 and 9 are pre-compressed toward the front of the vehicle body in initial conditions. Therefore, when a driving force acts on the rear wheel 2, for example, during vehicle acceleration, the small deflection allowances of the rubber bushes 26 reduce the delay of power transmission to the vehicle body. This improves vehicle acceleration response to the operation of an accelerator. In addition, during acceleration, squat movement of the vehicle body causes the rubber bushes 26 to experience larger urging forces as the vehicle is accelerated more abruptly. Therefore, the vehicle can obtain high acceleration response without any delay even if a large driving force acts on the rear wheel.

On the other hand, during vehicle braking, the deflection of the rubber bushes 26 may cause a delay of transmission of a braking force from the rear wheel 2 to the vehicle body. In this embodiment, however, the rear suspension A during braking is increased in the amount of rebound to decrease the vertical reaction force of the damping, device 14. Therefore, the urging force on each rubber bush 26 is reduced as a whole so that the direction of its deflection can be inverted relatively early. In addition, in this embodiment, the amount of toe-in of the rear wheel 2 is increased by longitudinal force compliance steering during braking so that the rise of a braking force between the rear wheel and the road surface can be steepened. Therefore, even if the deflection of the rubber bushes 26 causes a delay of transmission of the braking force to the vehicle body, there is only a small amount of delay of rise of the braking force as the whole vehicle. As a result, the brake feeling is not substantially impaired.

Furthermore, in this embodiment, the rear suspensions A, A having the above-described structure are mounted to the vehicle body through the sub frame 3 by means of a total of six resilient mounts 23, 23, . . . . This enables the use of resilient mounts 23 individually having soft damping characteristics thereby offering further improved ride quality. In addition, even if the entire sub frame 3 is displaced with respect to the vehicle body, the suspension links 6–10 do not change the relative position among them and the relative position with the road surface. Therefore, the handling stability are not substantially affected by the displacement of the sub frame 3.

Other Embodiments

The present invention is not limited to the structure of the foregoing embodiment, but encompasses various other structures. In the foregoing embodiment, the right and left rear suspensions A, A are mounted to the vehicle body through the sub frame 3. Instead of this, the rear suspensions A, A may be mounted directly o the vehicle body.

Also, in the rear suspension A of the foregoing embodiment, the vehicle body side junctions of the five links 6–10 are provided with rubber bushes 26, while their wheel side ends are connected to the wheel support 11 through ball joints 27. Alternatively, all or some of the links may be provided at both ends with rubber bushes. Furthermore, the resilient bush is not limited to the rubber bush 26, and may be made of resin having desired resilience.

What is claimed is:

1. A multi-link rear suspension system in which a support member for a rear wheel of a vehicle is connected to a vehicle body through five links, at least ends of the links toward the vehicle body are provided with resilient bushes, respectively, and a lower end of a damping device constituted by a coil spring and a damper is pivoted to a portion of the support member for the rear wheel located toward the inside of the vehicle body, wherein the damping device is disposed with respect to a suppositive king pin axle for the rear wheel so that a vertical reaction force thereof produces a moment toward toe-in about the suppositive king pin axle, and the damping device is spaced apart from the rear wheel toward the inside of the vehicle body so that the vertical reaction force thereof produces a moment toward negative camber on the rear wheel, and wherein the moment toward negative camber produced by the vertical reaction force of the damping device is set to be always larger than any moment toward positive camber produced by a side force on the rear wheel during vehicle cornering until limit maneuvering conditions due to the side force for the rear wheel during cornering are reached.

2. The rear suspension system of claim 1, wherein the suppositive king pin axle for the rear wheel is inclined rearward so that an upper portion thereof is located closer to the rear of the vehicle body, wherein an axis of the damping device is located inwardly from the suppositive king pin axle in non-parallel and non-intersecting relation to the suppositive king pin axle, and wherein an inclination of the axis of the damping device as viewed from the side of the vehicle body is set to be closer to a vertical direction than the suppositive king pin axle.

3. The rear suspension system of claim 2, wherein the lower end of the damping device is pivoted to one end of a connecting part formed integrally with the support member for the rear wheel to extend from the support member toward the inside of the vehicle body.

4. The rear suspension system of claim 2, wherein the suppositive king pin axle for the rear wheel is set to provide a negative caster.

5. The rear suspension system of claim 2, wherein the damping device is disposed so that an urging force in a longitudinal direction of the vehicle body acting on the rear wheel by the vertical reaction force of the damping device becomes very small or zero.

6. The rear suspension system of claim 1, wherein the lower end of the damping device is pivoted to one end of a connecting part formed integrally with the support member for the rear wheel to extend from the support member toward the inside of the vehicle body.

7. The rear suspension system of claim 6, wherein when viewed in a longitudinal direction of the vehicle, the connecting part has upper and lower arms that extend from upper and lower ends of a body of the support member toward the inside of the vehicle body and are combined together at ends remote from the body of the support member, and an intermediate arm extending vertically to connect the upper and lower arms between intermediate points thereof in a widthwise direction of the vehicle, and wherein one end of a fulcrum pin disposed across the intermediate arm and the remote ends of the upper and lower arms extends beyond an end of the connecting part toward the inside of the vehicle body, and the lower end of the damping device is fitted to said one end of the fulcrum pin.

8. The rear suspension system of claim 1, wherein the suppositive king pin axle for the rear wheel is set to provide a negative caster.

9. The rear suspension system of claim 1, wherein the damping device is disposed so that an urging force in a longitudinal direction of the vehicle body acting on the rear wheel by the vertical reaction force of the damping device becomes very small or zero.

10. The rear suspension system of claim 9, wherein an axis of the damping device is set to extend substantially in a vertical direction when viewed from the side of the vehicle body.

11. The rear suspension system of claim 10, wherein the axis of the damping device is inclined so that an upper portion thereof is located closer to the inside of the vehicle body when viewed in the longitudinal direction of the vehicle body, and the damping device is spaced a predetermined distance or more apart from a body of the support member for the rear wheel toward the inside of the vehicle body.

12. The rear suspension system of claim 9, wherein the damping device is disposed to slightly urge the rear wheel toward the front of the vehicle body by its vertical reaction force.

13. The rear suspension system of claim 12, wherein the rear wheel is a driving wheel.

14. The rear suspension system of claim 12, wherein the five links include at least two lower links, and the two lower links are arranged to converge toward the outside of the vehicle body when viewed from above the vehicle body.

15. The rear suspension system of claim 9, wherein an axis of the damping device is located closer to the rear of the vehicle body than the center of the rear wheel when viewed from the side of the vehicle body, and wherein the resilient bush for a lower link of the five links is softer than the resilient bush for an upper link thereof.

16. The rear suspension system of claim 1, wherein the rear suspension system is arranged so that the amount of toe-in of the rear wheel during cornering is increased by roll steering when a bump is encountered and also increased by side force compliance steering.

17. The rear suspension system of claim 16,
wherein a bump stopper for restricting approaching displacement of the rear wheel toward the vehicle body is disposed coaxially with the damping device, and
wherein the suspension system is arranged so that the moment toward toe-in acting on the rear wheel by the vertical reaction force of the damping device is increased as a result of the reaction force of the damping device being increased by the action of the bump stopper.

18. The rear suspension system of claim 1,
wherein the ends of the five links toward the vehicle body are connected to a sub frame, and
wherein the sub frame is mounted to the vehicle body through three resilient mounts at each of the right and left sides of the vehicle body and a total of six resilient mounts.

19. A multi-link rear suspension system in which a support member for a rear wheel of a vehicle is connected to a vehicle body through five links, at least ends of the links toward the vehicle body are provided with resilient bushes, respectively, and a lower end of a damping device constituted by a coil spring and a damper is pivoted to a portion of the support member for the rear wheel located toward the inside of the vehicle body, wherein a suppositive king pin axle for the rear wheel is inclined rearward so that an upper portion thereof is located closer to the rear of the vehicle body and is set to provide a negative caster, wherein an axis of the damping device is located inwardly from the suppositive king pin axle in non-parallel and non-intersecting relation to the suppositive king pin axle, is also located at a position closer to the rear of the vehicle body than the center of the rear wheel when viewed from the side of the vehicle body, and is set to extend substantially in a vertical direction, and wherein the damping device is spaced a predetermined distance or more apart from the rear wheel toward the inside of the vehicle body so that a moment toward negative camber acting on the rear wheel by a vertical reaction force of the damping device is always larger than any moment toward positive camber produced by a side force on the rear wheel during cornering of the vehicle until limit maneuvering conditions due to the side force for the rear wheel during cornering are reached.

* * * * *